US007297479B2

(12) United States Patent
Mills, Jr.

(10) Patent No.: US 7,297,479 B2
(45) Date of Patent: Nov. 20, 2007

(54) DNA-BASED ANALOG NEURAL NETWORKS

(75) Inventor: Allen P. Mills, Jr., Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1280 days.

(21) Appl. No.: 09/741,179

(22) Filed: Dec. 21, 2000

(65) Prior Publication Data

US 2003/0022164 A1    Jan. 30, 2003

Related U.S. Application Data

(63) Continuation-in-part of application No. 09/129,958, filed on Aug. 6, 1998, now Pat. No. 6,741,956.

(60) Provisional application No. 60/239,263, filed on Oct. 12, 2000.

(51) Int. Cl.
*C12Q 1/68* (2006.01)
*C12P 19/34* (2006.01)

(52) U.S. Cl. .................... 435/6; 435/91.1; 435/91.2

(58) Field of Classification Search .................... None
See application file for complete search history.

(56) References Cited

U.S. PATENT DOCUMENTS

| | | | | |
|---|---|---|---|---|
| 4,716,106 A * | 12/1987 | Chiswell | ......................... | 435/6 |
| 5,648,211 A | 7/1997 | Fraiser et al. | | |
| 5,862,304 A | 1/1999 | Ravdin et al. | | |
| 5,933,819 A | 8/1999 | Skolnick et al. | | |
| 5,983,211 A | 11/1999 | Heseltine et al. | | |
| 6,060,240 A * | 5/2000 | Kamb et al. | .................... | 435/6 |
| 6,613,508 B1 * | 9/2003 | Ness et al. | ..................... | 435/6 |

OTHER PUBLICATIONS

"DNA Analog Vector Algebra and Physical Constraints on Large-Scale DNA-Based Neural Network Computation," A.P. Mills, Jr., et al., DIMACS Series in Discrete Mathematics and Theoretical Computer Science, 54, pp. 65-73, 2000.
"Prospects For Large-Scale Neural Network Computation Using DNA Molecules," International Symposium on Cluster and Nanostructure Interfaces, Richmond, VA, Oct. 25-28, 1999, A.P. Mills, Jr., et al., Bell Labs, Lucent Technologies, 600 Mountain Avenue, Murray Hill, NJ 07974, pp. 685-691, 2000.
"Experimental aspects of DNA neural network computation," A.P. Mills, Jr., et al., Soft Computing, 5(2001), pp. 10-18, 2001.
"Article for analog vector algebra computation," Allen P. Mills, Jr., et al., BioSystems, 52, pp. 175-180, 1999.
D. Duggan et al., "Expression profiling using cDNA microarrays," Nature Genetics Supplement 21:10-14, 1999.
B. Wilamowski "Neural Networks and Fuzzy Systems," in The Electronics Handbook, edited by J. Whitaker, CRC Press, Inc., Boca Raton, Florida, 1996, pp. 1893-1914.
I. Kovesdi et al., "Applications of neural networks in structure-activity relationships," Med. Res. Rev. 19(3):249-269, 1999.
M. Honeyman et al., "Neural network-based prediction of candidate T-cell epitopes," Nature Biotechnology 16:966-969, 1998.

N. Saccone et al., "Mapping genotype to phenotype for linkage analysis," Genetic Epidemiol. 17 Suppl.:S708, 1999.
Y. Shi et al., "Computational EST database analysis identifies a novel member of the neuropoietic cytokine family," Biophys. Res. Commun. 262(1):132-138, 1999.
T. Gress et al., "A pancreatic cancer-specific expression profile," Oncogene 13(8):1819-1830, 1996.
L. Whitney et al., "Analysis of gene expression in multiple sclerosis using cDNA microarrays," Ann. Neurol. 46(3):425-428, 1999.
J. DeRisi et al., "Use of a cDNA mocroarray to analyze gene expression patterns in human cancer," Nature Genetics 14:457-460, 1996.
"Neural Networks in Clinical Medicine," Will Penny, Ph.D., et al., Med. Decis Making 16, pp. 386-398, 1996.
"Neural networks and physical systems with emergent collective computational abilities," J.J. Hopfield, Proc. Natl. Acad. Sci. USA 79: 2554-2558, Apr. 1982.
"Multilayer Feedforward Networks are Universal Approximators," Kurt Homik, et al., Neural Networks 2: 359-366, 1989.
"Analog Electronic Neural Networks For Pattern Recognition Applications," Hans P. Graf, et al., Neural Networks: Concepts, Applications and Implementations I, edited by V. Milutinovic, et al., Prentice Hall, pp. 155-179, 1991.
"Learning Internal Representations by Error Propagation," D.E. Rumelhart, et al., Parallel Distributed Processing: Explorations in the Microstructure of Cognition, Ch. 8, edited by D.E. Rumelhart, et al., MIT Press, Cambridge, MA, pp. 318-362 1986.
"Expression monitoring by hybridization to high-density oligonucleotide arrays," David J. Lockhart, et al., Nature Biotechnology 14: 1675-1680, Dec. 1996.
"DNA chips: State-of-the art," Graham Ramsay, Nature Biotechnology 16: 40-44, Jan. 1998.
"Reliability and Efficiency of a DNA-Based Computation," R. Deaton, et al., Physical Review Letters 80(2): 417-420, 1998.

(Continued)

*Primary Examiner*—Lori A. Clow

(57) ABSTRACT

This invention is an oligomer-based analog neural network (ANN) comprising weight and saturation oligomers, the concentrations of which are selected such that activation of the ANN by a set of input oligomers generates a set of output oligomers, the sequences and relative concentrations of which are dependent on the sequences and relative concentrations of the input oligomers. The invention further includes methods for using such an ANN for solving any problems amenable to solution by a trained neural network. A preferred embodiment of the claimed invention is a DNA-based ANN that accepts cDNA molecules as inputs and analyzes the gene expression profile of the cells from which the cDNA is derived. The DNA-based ANN is typically trained with a computer to identify the weights giving accurate mapping of the inputs to the outputs; and the concentrations of weight oligomers of the DNA-based ANN are then selected accordingly.

4 Claims, 14 Drawing Sheets

OTHER PUBLICATIONS

"Multicolor molecular beasons for allele discrimination," Sanjay Tyagi, et al., Nature Biotechnology 16: 49-53, 1998.

"Screening unlabeled DNA targets with randomly ordered fiber-optic gene arrays," Frank J. Steemers, et al., Nature Biotechnology 18: 91-94, 2000.

"Sensitive Fluorescence-Based Thermodynamic and Kinetic Measurements of DNA Hybridization in Solution," Larry E. Morrison, et al., Biochemistry 32: 3095-3104, 1993.

"DNA Probes: Applications of the Principles of Nucleic Acid Hybridization," James G. Wetmur, Critical Reviews in Biochemistry and Molecular Biology, 26(3/4): 227-259, 1991.

"Denaturation and Renaturation of Deoxyribonucleic Acid," J. Marmur, et al., Progress in Nucleic Acid Research, 1: 231-300, 1963.

"Complex Traits on the Map," J. Ott, et al., Recent Results in Cancer Research, Springer-Verlag Berlin, 154: 285-291, 1998.

"High-fidelity mRNA amplification for gene profiling," Ena Wang, et al., Nature Biotechnology 18: 457-459, 2000.

"Interpreting patterns of gene expression with self-organizing maps: Methods and application to hematopoietic differentiation," Pablo Tamayo, et al., Proc. Natl. Acad. Sci. USA 96: 2907-2912, 1999.

"Analysis of gene expression data using self-organizing maps,"Petri Toronen, et al., FEBS Letters 451: 142-146, 1999.

"Exploring the Metabolic and Genetic Control of Gene Expression on a Genomic Scale," Joseph L. DeRisi, et al., Science 278: 680-686, 1997.

"Distinctive gene expression patterns in human mammary epithelial cells and breast cancers," Charles M. Perou, et al., Proc. Natl. Acad. Sci. USA 96: 9212-9217, 1999.

Expression profiling in cancer using cDNA microarrays, Javed Khan, et al., Electrophoresis 20: 223-229, 1999.

\* cited by examiner

SEQUENCE LISTING

<160> NUMBER OF SEQ ID NOS: 29

<210> SEQ ID NO 1
<211> LENGTH: 10
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 1
agctatcgat                                                          10

<210> SEQ ID NO 2
<211> LENGTH: 26
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 2
cctcacagat agaccaatag cacagg                                        26

<210> SEQ ID NO 3
<211> LENGTH: 26
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 3

```
cctgtgctat tggtctatct gtgagg                                          26

<210> SEQ ID NO 4
<211> LENGTH: 26
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 4
cctcgtagcc tccgtgcagt tatagg                                          26

<210> SEQ ID NO 5
<211> LENGTH: 26
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 5
cctataactg cacggaggct acgagg                                          26

<210> SEQ ID NO 6
<211> LENGTH: 43
<212> TYPE: DNA
<213> ORGANISM: Artificial Sequence
<220> FEATURE:
<223> OTHER INFORMATION: Description of Artificial Sequence: Synthetic
      illustrative nucleotide sequence
<221> NAME/KEY: modified_base
<222> LOCATION: (34)..(43)
<223> OTHER INFORMATION: A, T, C or G; this range may encompass 1 to 10
      nucleotides

<400> SEQUENCE: 6
aatgcaagat cgaaatttat acgtttatct tacnnnnnnn nnn                       43

<210> SEQ ID NO 7
<211> LENGTH: 43
<212> TYPE: DNA
<213> ORGANISM: Artificial Sequence
<220> FEATURE:
<223> OTHER INFORMATION: Description of Artificial Sequence: Synthetic
      illustrative nucleotide sequence
<221> NAME/KEY: modified_base
<222> LOCATION: (34)..(43)
<223> OTHER INFORMATION: A, T, C or G; this range may encompass 1 to 10
      nucleotides

<400> SEQUENCE: 7
aatgcaagat cgaaatttat acgtttatct tacnnnnnnn nnn                       43

<210> SEQ ID NO 8
<211> LENGTH: 30
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 8
aatgcaagat cgaaatttat acgtttatct                                      30

<210> SEQ ID NO 9
<211> LENGTH: 50
```

```
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 9
cacagataga ccaatagcac cacactgtca cgtagcctcc gtgcagttat           50

<210> SEQ ID NO 10
<211> LENGTH: 50
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 10
cgtagcctcc gtgcagttat cacactgtca cacagataga ccaatagcac           50

<210> SEQ ID NO 11
<211> LENGTH: 50
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 11
cacagataga ccaatagcac cacactgtca ataactgcac ggaggctacg           50

<210> SEQ ID NO 12
<211> LENGTH: 50
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 12
cgtagcctcc gtgcagttat cacactgtca gtgctattgg tctatctgtg           50

<210> SEQ ID NO 13
<211> LENGTH: 50
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 13
gtgctattgg tctatctgtg cacactgtca cgtagcctcc gtgcagttat           50

<210> SEQ ID NO 14
<211> LENGTH: 50
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 14
ataactgcac ggaggctacg cacactgtca cacagataga ccaatagcac           50

<210> SEQ ID NO 15
<211> LENGTH: 50
<212> TYPE: DNA
```

<213> ORGANISM: Artificial Sequence
<220> FEATURE:
<223> OTHER INFORMATION: Description of Artificial Sequence: Synthetic
      illustrative nucleotide sequence

<400> SEQUENCE: 15
gtgctattgg tctatctgtg cacactgtca ataactgcac ggaggctacg           50

<210> SEQ ID NO 16
<211> LENGTH: 50
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 16
ataactgcac ggaggctacg cacactgtca gtgctattgg tctatctgtg           50

<210> SEQ ID NO 17
<211> LENGTH: 10
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 17
cacactgtca                                                       10

<210> SEQ ID NO 18
<211> LENGTH: 10
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 18
tgacagtgtg                                                       10

<210> SEQ ID NO 19
<211> LENGTH: 30
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 19
aacctcacag atagaccaat agcacaggaa                                 30

<210> SEQ ID NO 20
<211> LENGTH: 30
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 20
aacctgtgct attggtctat ctgtgaggaa                                 30

<210> SEQ ID NO 21
<211> LENGTH: 30
<212> TYPE: DNA
<213> ORGANISM: Artificial Sequence

```
<220> FEATURE:
<223> OTHER INFORMATION: Description of Artificial Sequence: Synthetic
      illustrative nucleotide sequence

<400> SEQUENCE: 21
aacctcgtag cctccgtgca gttataggaa                                        30

<210> SEQ ID NO 22
<211> LENGTH: 30
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 22
aacctataac tgcacggagg ctacgaggaa                                        30

<210> SEQ ID NO 23
<211> LENGTH: 29
<212> TYPE: DNA
<213> ORGANISM: Artificial Sequence
<220> FEATURE:
<223> OTHER INFORMATION: Description of Artificial Sequence: Synthetic
      illustrative nucleotide sequence

<400> SEQUENCE: 23
ctacattcgt ggttgagcac tagcaggca                                         29

<210> SEQ ID NO 24
<211> LENGTH: 98
<212> TYPE: DNA
<213> ORGANISM: Artificial Sequence
<220> FEATURE:
<223> OTHER INFORMATION: Description of Artificial Sequence: Synthetic
      illustrative nucleotide sequence
<221> NAME/KEY: modified_base
<222> LOCATION: (4)..(9)
<223> OTHER INFORMATION: A, T, C or G; this range may encompass 3 to 6
      nucleotides
<221> NAME/KEY: modified_base
<222> LOCATION: (10)..(89)
<223> OTHER INFORMATION: A, T, C or G; this range may encompass 8 to 80
      nucleotides
<221> NAME/KEY: modified_base
<222> LOCATION: (90)..(95)
<223> OTHER INFORMATION: A, T, C or G; this range may encompass 3 to 6
      nucleotides

<400> SEQUENCE: 24
tacnnnnnnn nnnnnnnnnn nnnnnnnnnn nnnnnnnnnn nnnnnnnnnn nnnnnnnnnn       60
nnnnnnnnnn nnnnnnnnnn nnnnnnnnnn nnnnngta                               98

<210> SEQ ID NO 25
<211> LENGTH: 98
<212> TYPE: DNA
<213> ORGANISM: Artificial Sequence
<220> FEATURE:
<223> OTHER INFORMATION: Description of Artificial Sequence: Synthetic
      illustrative nucleotide sequence
<221> NAME/KEY: modified_base
<222> LOCATION: (4)..(9)
<223> OTHER INFORMATION: A, T, C or G; this range may encompass 3 to 6
      nucleotides
<221> NAME/KEY: modified_base
<222> LOCATION: (10)..(89)
<223> OTHER INFORMATION: A, T, C or G; this range may encompass 8 to 80
      nucleotides
<221> NAME/KEY: modified_base
<222> LOCATION: (90)..(95)
```

```
<223> OTHER INFORMATION: A, T, C or G; this range may encompass 3 to 6
      nucleotides

<400> SEQUENCE: 25
tacnnnnnnn nnnnnnnnnn nnnnnnnnnn nnnnnnnnnn nnnnnnnnnn nnnnnnnnnn    60
nnnnnnnnnn nnnnnnnnnn nnnnnnnnnn nnnnngta                            98

<210> SEQ ID NO 26
<211> LENGTH: 18
<212> TYPE: DNA
<213> ORGANISM: Artificial Sequence
<220> FEATURE:
<223> OTHER INFORMATION: Description of Artificial Sequence: Synthetic
      illustrative nucleotide sequence
<221> NAME/KEY: modified_base
<222> LOCATION: (1)..(6)
<223> OTHER INFORMATION: A, T, C or G; this range may encompass 3 to 6
      nucleotides
<221> NAME/KEY: modified_base
<222> LOCATION: (13)..(18)
<223> OTHER INFORMATION: A, T, C or G; this range may encompass 3 to 6
      nucleotides

<400> SEQUENCE: 26
nnnnnngtat acnnnnnn                                                  18

<210> SEQ ID NO 27
<211> LENGTH: 18
<212> TYPE: DNA
<213> ORGANISM: Artificial Sequence
<220> FEATURE:
<223> OTHER INFORMATION: Description of Artificial Sequence: Synthetic
      illustrative nucleotide sequence
<221> NAME/KEY: modified_base
<222> LOCATION: (1)..(6)
<223> OTHER INFORMATION: A, T, C or G; this range may encompass 3 to 6
      nucleotides
<221> NAME/KEY: modified_base
<222> LOCATION: (13)..(18)
<223> OTHER INFORMATION: A, T, C or G; this range may encompass 3 to 6
      nucleotides

<400> SEQUENCE: 27
nnnnnngtat acnnnnnn                                                  18

<210> SEQ ID NO 28
<211> LENGTH: 18
<212> TYPE: DNA
<213> ORGANISM: Artificial Sequence
<220> FEATURE:
<223> OTHER INFORMATION: Description of Artificial Sequence: Synthetic
      illustrative nucleotide sequence
<221> NAME/KEY: modified_base
<222> LOCATION: (1)..(6)
<223> OTHER INFORMATION: A, T, C or G; this range may encompass 3 to 6
      nucleotides
<221> NAME/KEY: modified_base
<222> LOCATION: (13)..(18)
<223> OTHER INFORMATION: A, T, C or G; this range may encompass 3 to 6
      nucleotides

<400> SEQUENCE: 28
nnnnnngtat acnnnnnn                                                  18

<210> SEQ ID NO 29
<211> LENGTH: 18
<212> TYPE: DNA
<213> ORGANISM: Artificial Sequence
<220> FEATURE:
<223> OTHER INFORMATION: Description of Artificial Sequence: Synthetic
```

```
        illustrative nucleotide sequence
<221>   NAME/KEY: modified_base
<222>   LOCATION: (1)..(6)
<223>   OTHER INFORMATION: A, T, C or G; this range may encompass 3 to 6
        nucleotides
<221>   NAME/KEY: modified_base
<222>   LOCATION: (13)..(18)
<223>   OTHER INFORMATION: A, T, C or G; this range may encompass 3 to 6
        nucleotides

<400>   SEQUENCE: 29 nnnnnngtat acnnnnnn                                                        18
```

DNA-BASED ANALOG NEURAL NETWORKS

CROSS-REFERENCES TO RELATED APPLICATIONS

This application is a continuation-in-part of U.S. patent application Ser. No. 09/129,958, filed Aug. 6, 1998 now U.S Pat. No. 6,741,956. This application also claims the benefit of the filing date of U.S. provisional application Ser. No. 60/239,263, filed Oct. 12, 2000 by Allen P. Mills, Jr., et al., and entitled "DNA-Based Artificial Neural Networks."

BACKGROUND OF THE INVENTION

1. Field of the Invention

This invention relates to analog neural networks and DNA.

2. Description of Related Art

An analog neural network (ANN) is a parallel, distributed, information-processing system that responds to input information. An ANN can be "trained" by exposure to training data so that it is able to detect or recognize a pattern in input data. An ANN consists of many processing units that send signals to other processing units in the network. The signals that a particular processing unit receives are weighted to determine the signal that the unit then sends to other processing units to which it is connected. In most neural network models, a saturating function is applied to signal sent by one processing unit to another so that outputs of the unit have a value between zero and one. Processing units that operate in this manner are known as "perceptrons."

Neural networks model tasks such as pattern classification, clustering of data, non-linear input/output mapping, associative memory storage, vision and speech preprocessing, and the solution of combinatorial optimization problems.

The parallel operations and interactions of the processing units of a neural network may give rise to collective properties that include production of a content-addressable or an associative memory.

Single-layer perceptrons (SLPs) and multi-layer perceptrons (MLPs) are "feedforward" neural network models that include one or more layers of processing units, i.e., perceptrons. These models propagate the input signal through the network one layer at a time. An SLP consists of a single perceptron layer, and can classify an input vector into one of two classes. An MLP consists of an "input layer" of sensory units, one or more "hidden layers" of perceptrons, and one "output layer" of processing units. In an MLP, every unit in a layer is connected to every unit in the layer "below." An MLP maps a set of variables in an input vector from a multidimensional input space onto a multidimensional output space of a set of output variables. The structure of the network and the values of the weights determine the result of the input/output mapping. The values of the weights that enable the network to accomplish the mapping are chosen through a training process that identifies those weights that best approximate the desired mapping for every pairing of input data and output data in the training set. The neural network adapts to its function according to the training information presented during training.

Feed-forward MLPs trained by back-propagation of errors are used successfully for non-linear signal processing and speech recognition.

In medicine, such MLPs use medical data relating to diseases to assist in diagnosis and prognosis. In analyzing data related to myocardial infarction, tumor classification, and thyroid function, for example, diagnoses based on analysis of data by a neural network have been more accurate than those based on analyses carried out by other paradigms. ANNs have also been trained to prognostically predict the future re-occurrence of breast cancer in patients, and to analyze the risk of developing diabetes mellitus.

Neural network algorithms have been successfully applied to analyze relationships between structural or physicochemical properties of molecules and their biological or biochemical activities.

ANNs have also been trained to identify sets of genetic marker loci involved in disease etiology; and to identify nucleotide sequences that encode a protein structural motif.

Microarray and cDNA grid hybridization techniques have been developed that simultaneously detect and quantitate the expression of many different genes in a sample of cells in a single experiment. This procedure has come to be referred to as "gene profiling" or "expression profiling." A number of different and effective methods for gene expression profiling have been developed. These methods typically involve isolating cellular RNA, and preparing a set of cDNA or amplified RNA molecules that represent the mRNA molecules present in the cells of interest, labeling these with a detectable label such as a fluorochrome or a radioisotope, hybridizing the labeled polynucleotides to a DNA or oligonucleotide microarray or grid, and identifying sites in the microarray or grid at which the labeled polynucleotides hybridized.

Neural network training algorithms have also been used to organize and analyze gene expression data for hundreds of different genes that have been collected in gene expression profiling experiments.

The above-discussed ANNs are implemented using computers and software that carry out the mathematical functions underlying the operation of the ANNs.

BRIEF SUMMARY OF THE INVENTION

In one aspect, the invention provides a method and a system for implementing an analog neural network in which the components of the input, processing, and output data of the neural network are represented by DNA oligomers or their analogs having defined sequences. Biochemical reactions and interactions of the DNA oligomers represent logical functions, including the interconnections and the weighting of signals transmitted between the neuronal units of the neural network. Logical operations are represented by reactions of DNA oligomers. The operations may involve negative and/or non-negative numbers, and may include vector addition, multiplication of a vector by a scalar, determination of inner and outer products of vectors, and matrix multiplication and addition. The biochemical reactions of DNA oligomers or their analogs may include molecular diffusion and recognition, Watson-Crick base-pairing, template-directed polymerization and amplification, site-specific cleavage by restriction enzymes, digestion by nucleases, and chemical modification of nucleic acids. Analog representation of the parallel operations of a neural network uses Watson-Crick hybridization of complementary DNA oligomers. This second-order reaction proceeds at a rate that depends on the concentrations of the complementary oligomers. The embodiments represent sending a weighted signal between two elements of a neural network by mixing of appropriate concentrations of complementary DNA oligomers and allowing the oligomers to hybridize for a controlled period of time.

DNA-based neural networks according to the embodiments operate as parallel, distributed, information-processing systems. Various embodiments of DNA-based neural networks form associative or content addressable memories, and represent single-layer or multi-layer perceptrons. Preferred embodiments of DNA-based neural networks assist in diagnosis or prognosis of a patient's condition, and predict onset or occurrence of medical conditions or diseases. Some DNA-based neural networks employ input oligomers having nucleotide sequences of portions of mRNA molecules present in cells of a human or veterinary patient to determine if the pattern of genes being expressed is one that is diagnostic or prognostic of a disease.

The abbreviation RE stands for a restriction enzyme.

Figure 14:
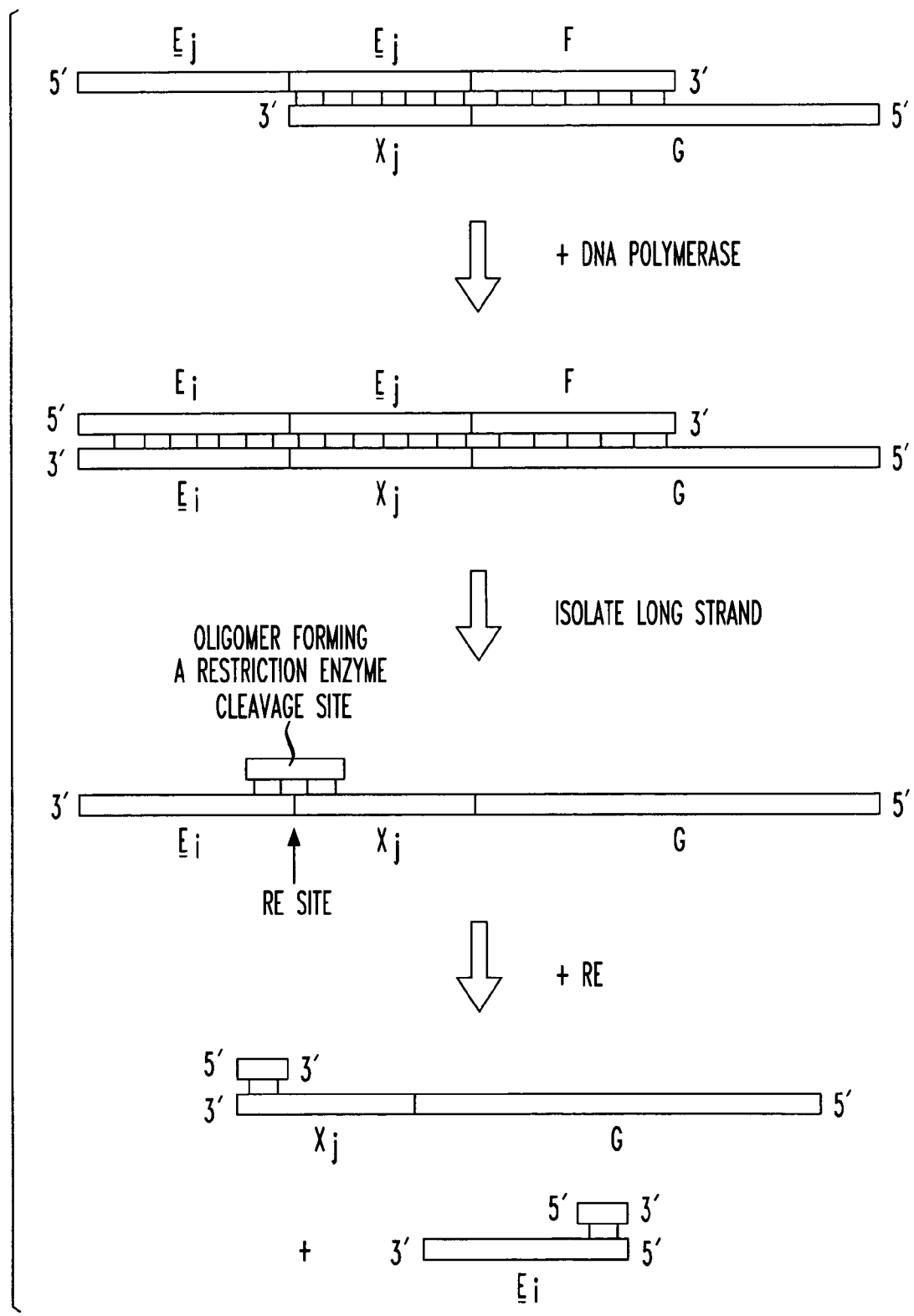

FIG. 14 schematically represents a process that determines the product of vector X and matrix $T_{ij}$. DNA strands containing $\{\underline{X}_j\}$ are used to select $\{\underline{V}_i\}$ strands of the form $\{E_i\}$ and $\{\underline{E}_i\}$ that represent a changed sign contribution to the product.

DETAILED DESCRIPTION OF THE INVENTION

Unless otherwise defined, all technical and scientific terms used herein have the same meanings as are commonly understood by one skilled in the art to which this invention belongs. While the preferred methods and materials are described, it is envisioned that methods and materials similar or equivalent to those described herein can also be used in the practice or testing of the present invention.

Representing Vectors and Matrices with Oligomers

The present invention uses sets of DNA oligonucleotides and/or oligonucleotide analogs having selected subunit sequences to represent mathematical vectors and matrices.

Vectors

Any m-component vector V in a space with basis vectors $e_i$, i=1, 2, ..., m is represented by the equation $$V = \Sigma_i V_i e_i \qquad (1).$$

A subset of all single-stranded DNA n-mers is selected to be in 1:1 correspondence with the basis vectors $e_i$, i=1, 2, ..., m in an abstract m-dimensional vector space. The analog representation of V is then a DNA sample containing strands $E_i$, with the concentration of each strand $[E_i]$ being proportional to the amplitude $V_i$ of the i-th component of the vector. For example, a typical 10-mer, $E_i$=5' AGCTATCGAT 3' (SEQ ID NO:1) can be associated with the basis vector $e_i$ identifying one direction in a space of at most $4^{10}=10^6$ dimensions. The analog accuracy of representing a vector V in this manner will be limited by Poisson fluctuations in the numbers of molecules in a finite sample volume; roughly 1 pmole of DNA oligomers would represent a random vector for m=$10^8$ with roughly 1% errors in the individual amplitudes. Since DNA concentrations are always positive, an appropriate representation for negative amplitudes is needed. Negative amplitudes associated with unit vectors $e_i$ are represented by DNA oligomers $\underline{E}_i$ having a nucleotide sequence complementary to $E_i$. As a result, when two vectors are added, any positive and negative amplitudes will hybridize, and the resulting double-stranded DNA oligomers can be removed from the set of single-stranded DNA molecules; for example, by digestion with a suitable enzyme, or by column separation.

Examples of data sets or items of experience that may be represented by single-stranded DNA oligonucleotides or their analogs include positive or negative numerical values generated in solving a mathematical problem; alphanumeric characters; names, addresses, and phone numbers; book titles, authors, and publishers; x-y coordinates of pixels forming an image; 3-dimensional coordinates of atoms in a protein; nucleotide sequences of genes; and gene expression profiles of various types of cells at different stages of development or disease progression. Essentially, any data sets or items of experience that can be represented by one or more sets of m-component vectors of the form $V=\Sigma_i V_i e_i$ can be represented by an one or more sets of single-stranded DNA oligonucleotides or their analogs.

Matrices

Similarly, any p-component matrix T in a space with basis vectors $e_{ij}$, i=1, 2, ..., q and j=1, 2, ..., r is represented by the equation $$T=\Sigma_{ij} T_{ij} e_{ij} \quad (2),$$

where a subset of all single-stranded DNA n-mers is selected to be in 1:1 correspondence with the basis vectors $e_{ij}$, for i=1, 2, ..., q and j=1, 2, ..., r in an abstract vector space of (q×r=p) dimensions. As with vectors, the analog representation of T is a DNA sample containing strands $E_{ij}$ representing components of positive amplitude, and strands $\underline{E}_{ij}$ representing components of negative amplitude, where strands $E_{ij}$ are complementary to strands $\underline{E}_{ij}$, and the concentration of each strand of strands $E_{ij}$ or $\underline{E}_{ij}$ is proportional to the amplitude $T_{ij}$ of the corresponding matrix component.

In a preferred embodiment of the invention, DNA oligomers are used to represent a matrix that relates the components of one vector with those of one or more other vectors, or of the same vector. For example, a matrix formed as the outer product of two vectors as described below. Each component of such a matrix is represented by a set of single-stranded DNA oligomers comprising one or more sequences $E_i$ or $\underline{E}_i$ that represent a component of positive or negative amplitude, respectively, of at least one of the vectors related by the matrix. The sequences $E_i$ or $\underline{E}_i$ in the oligomer strands representing such a matrix are in 1:1 correspondence with the basis vectors $e_i$, i=1, 2, ..., m, and the relative concentrations of $E_i$ or $\underline{E}_i$ sequences in the oligomer strands representing such a matrix are quantitatively determined by the way that the vectors are related by the matrix.

Nucleic Acid Oligomers and Their Analogs

An oligomer is a linear polymer consisting of a relatively few subunits. An oligomer having n subunits is referred to as an n-mer; for example, a nucleic acid oligomer that contains 12 or 17 nucleotides is referred to as a 12-mer or as a 17-mer, respectively. As used herein, the term "oligomers" refers to RNA or DNA oligonucleotides, RNA or DNA oligonucleotide analogs, or a combination of RNA and/or DNA oligonucleotides and RNA and/or DNA oligonucleotide analogs. Such oligomers can be used in representing vectors and matrices, operations involving vectors and matrices, including vector addition and vector algebra, and in implementing a neural network. Oligonucleotide analogs include but are not limited to oligomers comprising 2'-O-alkyl ribonucleotides, phosphorothioate or methylphosphonate internucleotide linkages, peptide nucleic acid subunits, and nucleotides modified by attachment of radioactive or fluorescent groups, groups which intercalate, cross-link or cleave a nucleic acid, or groups which alter the electric charge or hydrophobicity of the oligomers. Methods for making and using oligonucleotides and oligonucleotide analogs such as those listed above are well known to those skilled in the art of making and using sequence-specific, hybridizing oligomers.

In general, an essential property of the oligomers employed in practicing the invention is that they are able to hybridize specifically to oligomers having complementary subunit sequences to form stable double-stranded complexes. Herein, hybridization means that a first oligomer comprising a nucleotide sequence complementary to a sequence in a second oligomer binds by Watson-Crick base-pairing to the complementary portion of the second oligomer to form a stable double-stranded complex. Hybridization conditions are sufficiently stringent that oligomer molecules having fewer bases complementary to, or forming less stable duplex structures with, the second oligomer do not also hybridize to the second oligomer and form such a stable double-stranded complex. Selection of lengths of the complementary portions of the different oligomers and the conditions used in hybridization and wash steps, so that the oligomers hybridize specifically to their counterparts, is known to persons of ordinary skill in the art.

The sizes of the oligomers employed in practicing the present invention can range from about 4 subunits to 100 or more subunits in length. Depending on the complexity of the data being represented, the basis vectors can be represented by DNA n-mers of from about 8 up to about 20, 30, 50, 80 or more nucleotides; preferably of about 10 to about 30 nucleotides. In a preferred embodiment of the invention, n-mers representing basis vectors have about 6 to 12 additional nucleotides added to each end to stabilize hybridization of termini, to permit re-separation of oligomers joined end-to end, and to permit amplification by PCR using a common set of primers. Thus, DNA oligomers representing basis vectors are typically about 18 to about 74 or more nucleotides in length; preferably about 20 to about 50 nucleotides in length. In the methods involving hybridization of basis vector oligomers to oligomers attached to a substrate, the basis vector oligomers can be longer, shorter, or the same length as the attached oligomers. In addition, basis vector oligomers having different lengths, chemical structures and properties, can be hybridized to different sites of the same oligomer array.

The specificity and affinity with which oligomers hybridize are determined by the length, nucleotide sequence, and chemical structure of the oligomers, the ionic strength, and temperature of the reaction mixture. The subunit sequences can be selected so that, under the reaction conditions employed, the oligomers do not comprise self-complementary sequences that stabilize folding of said oligomers into hairpin structures which interfere with formation of interstrand duplexes. The subunit sequences can also be selected so that the melting temperatures (Tm) of the double-stranded complexes formed by hybridization oligomers attached at different sites of an array are all within a selected temperature range, e.g., Tm plus or minus about 5 degrees.

Obtaining the Oligomers

The present invention employs multiple sets of large numbers of different DNA oligonucleotides or their analogs having specified lengths and subunit (e.g., nucleotide) sequences. The oligomers of the present invention can be made by methods well known to those skilled in the art of synthesizing oligonucleotides and/or oligonucleotide analogs. For example, the oligomers can be synthesized on a solid-substrate using restriction enzyme-mediated nucleotide addition and then released from the substrate and amplified, as described in U.S. Pat. No. 6,083,726 issued on Jul. 4, 2000, "Methods for Polynucleotide Synthesis and Articles for Polynucleotide Hybridization," the entire disclosure of which is incorporated herein by reference. Alternatively, the oligomers can be synthesized by well-known chemical means, or by template-mediated polymerization (e.g., by polymerase chain reaction—PCR).

An Oligomer Storing Device

In a preferred embodiment of the invention, the required oligomers are synthesized and stored in an oligomer storing device, from which they are released as they are needed. A preferred oligomer storing device comprises a substrate supporting an array of oligomer storage sites, or depots, each of which comprises a surface to which are attached oligomers having a selected subunit sequence. The oligomers are stored in the depots of the storing device by allowing them to hybridize by Watson-Click pairing to the oligomers attached to the surfaces of said depots to form double-stranded complexes. When oligomers having a particular nucleotide sequence are needed, they are released from the oligomer storing device by locally denaturing the double-stranded complexes of the depot in the storage array where they are stored, e.g., by localized heating, without denaturing double-stranded complexes of the depots storing other oligomers. The desired oligomers are then collected from the solution in contact with the oligomer storage array. A device for storing and releasing oligomers having particular sequences is described in U.S. Pat. No. 6,150,102, issued Nov. 21, 2000, entitled "Method for Generating Nucleic Acid Oligomers of Known Composition," the entire disclosure of which is incorporated herein by reference.

Manipulations of Oligomers to Represent Vector and Matrix Operations

The embodiments enable making DNA oligomers that represent multi-component vectors and matrices, and using the oligomers in biochemical reactions that represent operations of vector and matrix algebra. The operations include vector addition, matrix addition, multiplication of a scalar and a vector, and multiplication of a scalar and a matrix, forming inner and outer products of vectors, multiplication of a matrix by a vector, and multiplication of matrices Representing Vectors and Matrices with Oligomers The invention provides analog methods for carrying out operations of vector and matrix algebra on input data. Each m-component vector V, where $V=\Sigma_i V_i e_i$, is represented by a set of single-stranded oligomers $E_i$ and $\underline{E}_i$ that are in 1:1 correspondence with the basis vectors $e_i$, $i=1, 2, \ldots, m$ in an abstract m-dimensional vector space. The $E_i$ and $\underline{E}_i$ oligomers corresponding to a given basis vector $e_i$ have complementary nucleotide sequences; the $E_i$ oligomers represent the i-th component of V for which the amplitude $V_i$ is positive, and the $\underline{E}_i$ oligomers represent the i-th component of V for which $V_i$ has a negative value. The concentration of each of the oligomers $E_i$ and $\underline{E}_i$ is proportional to the absolute value of the amplitude $V_i$ of the i-th component of V.

In order to represent operations of vector and matrix algebra in a DNA "language," for example, to implement a neural network, the single-stranded DNA oligomers used to represent $E_i$ and $\underline{E}_i$ are preferably of the form 5' $R_1 R_2 \ldots R_r N_1^i N_2^i N_3^i \ldots N_q^i S_1 S_2 \ldots S_r$ 3', where the $E_i = N_1^i N_2^i \ldots N_q^i$ is in correspondence with a basis vector $e_i$. Two r-mers, $R_1 R_2 \ldots R_r$ and $S_1 S_2 \ldots S_r$ with $r \approx 10$, are placed at the ends of all $E_i$ and $\underline{E}_1$ to assist in operations such as hybridization, ligation, and cutting via a restriction enzyme.

Since $4^q$ different sequences of length q can be formed from four types of nucleotides, $4^q \geq m$ if the DNA oligomers are to represent the m basis vectors. Preferably, $4^q >> m$, So that the subset of q-mers corresponding to the $e_i$ can be selected to be oligomers that are non-palindromic and relatively free of hairpin effects, and have minimal overlap with the other basis vectors.

Manipulations of Oligomers

In general, for performing operations on one or more vectors, the method of the present invention comprises the steps of:

(1) obtaining a composition comprising at least one set of single-stranded oligomers $E_i$ and $\underline{E}_i$ representing the components of a vector, wherein the concentrations of the oligomers $E_i$ or $\underline{E}_i$ in the composition are proportional to the absolute values of the amplitudes of the components they represent, which composition represents input data;

(2) subjecting said composition to at least one physical or chemical treatment having an effect on said oligomers in said composition that is an analog representation of an operation of vector or matrix algebra; and (3) detecting the effect of said treatment on said oligomers in said composition to determine the analog result of carrying out said operation of matrix algebra on said input data.

The concentrations of the oligomers $E_i$ and $\underline{E}_i$ are proportional to the absolute value of the amplitudes of the corresponding vector components, as noted above. Accordingly, the accuracy of carrying out an operation of matrix algebra on the input data is quantitatively limited by Poisson fluctuations in the oligomer concentrations in a sample volume.

The concentrations of the oligomers that represent an analog result of an operation of vector or matrix algebra according to the present invention can be quantitatively measured by methods known to those skilled in the art. One method for measuring the concentrations include allowing the oligomers to hybridize to complementary molecular beacon probes in solution or arrayed on a solid substrate, and measuring the resulting fluorescence. Alternatively, the oligomers that represent the mathematical result can be fluorescently labeled, and their concentrations can be measured by measuring their fluorescence following hybridization to a high-density oligonucleotide array.

The physical or chemical treatments to which the composition comprising input oligomers is subjected in step (2) above may include one or more of the following: (a) changing the relative concentrations of the oligomers in said composition; (b) allowing complementary oligomers in said composition to hybridize to each other; (c) determining the concentration of double-stranded oligomers in the composition; (d) separating double-stranded oligomers from non-double-stranded oligomers in the composition; (e) measuring the rate of hybridization of complementary oligomers in the composition; (f) ligating oligomers together, (g) adding oligomer subunits to an end of an oligomer in an enzyme-catalyzed reaction; (h) using an oligomer as a template in synthesizing a complementary oligomer sequence in a polymerase-catalyzed reaction; (i) chemically or enzymatically modifying (e.g., phosphorylating or de-phosphorylating, methylating or de-methylating) a subunit of an oligomer without adding an additional oligomer subunit; and (j) cleaving an oligomer with a restriction enzyme.

Multiplication of Vector by a Scalar

An analog representation of multiplication of a vector by a scalar is provided by obtaining a composition comprising a set of single-stranded oligomers that represents the input vector, and then treating the composition so as to change the total concentration of the oligomers by a factor equivalent to the scalar by which the vector is multiplied. The method can use various means for changing the concentration of oligomers known to those skilled in the art. For example, an appropriate buffer solution can be added to the oligomers to reduce their concentration, or solvent can be removed from the composition (e.g., by lyophilization) to increase the concentration of the oligomers.

Addition of Vectors

An analog representation of addition of two vectors is provided by obtaining for each vector a set of single-stranded oligomers $E_i$ and $\underline{E}_i$ representing the components of the vector, wherein the concentrations of the oligomers $E_i$ and $\underline{E}_i$ are proportional to respective positive and negative amplitudes of the components; mixing together for each vector an amount of the set of oligomers representing said vector; and allowing complementary oligomers in the resulting mixture to hybridize. The set of single-stranded oligomers that remains after complementary oligomers have hybridized represents the sum of the added vectors. The mathematical value for the sum of the vectors can be determined by measuring the concentrations of the single-stranded oligomers in the mixture. Concentrations of single-stranded oligomers in the presence of contaminating double-stranded oligomers can be measured directly, for example, using molecular beacons or an oligonucleotide array. The single-stranded oligomers can also be separated from the double-stranded oligomers in the mixture, e.g., by gel electrophoresis or column chromatography, prior to quantitation of the single-stranded oligomers.

Determining the Inner Product of Two Vectors

An analog representation of determining the inner product $\Sigma_i V_i W_i$ of two m-component vectors V and W is provided by the present invention by:

(i) obtaining for each vector V and W a set of single-stranded oligomers $E_i$ and $\underline{E}_i$ for i=1 to m representing the components of the vector, wherein the concentrations of the oligomers $E_i$ and $\underline{E}_i$ are proportional to the respective positive and negative values of the amplitudes of the components; and obtaining a set of single-stranded oligomers $E_i$ and $\underline{E}_i$ representing the components of vector $\underline{W}$ that are complementary to said oligomers representing vector W, wherein the relative concentrations of the various oligomers representing $\underline{W}$ are respectively proportional to the concentrations of their complementary counterpart oligomers in W;

(ii) mixing a sample of the oligomers representing vector V with a sample of the oligomers representing vector W, and measuring the rate of hybridization $R_-$ in the mixture, which is proportional to the contribution to the result from quantities of opposite sign; and (iii) mixing separately a sample of the oligomers representing vector V with a sample of the oligomers representing vector $\underline{W}$, and measuring the rate of hybridization $R_+$ in the reaction mixture, which is proportional to the contribution to the result from quantities of like sign.

One skilled in the art would, of course, recognize that the hybridization rate $R_+$ obtained in step (iii) above can also be determined by (a) obtaining a set of single-stranded oligomers $E_i$ and $\underline{E}_i$ representing a vector $\underline{V}$ whose components are complementary to those of vector V, wherein the relative concentrations of the oligomers representing $\underline{V}$ are proportional to the concentrations of their complementary counterparts in V; and (b) combining the oligomers representing vector V with a sample of the oligomers representing vector W, and measuring the rate of hybridization $R_+$ in the reaction mixture.

The hybridization reactions of steps (ii) and (iii) above are carried out under reaction conditions (temperature, ionic strength, etc.) for which the oligomers corresponding to different basis vectors do not form stable hybrids. Complementary oligomers $E_i$ and $\underline{E}_i$ corresponding to the same basis vector $e_i$ do hybridize to form stable double-stranded molecules.

(iv) The inner product of the two vectors V and W can then be determined quantitatively from the difference of the hybridization rates $R_+$ and $R_-$, where each rate $R_+$ and $R_-$ is suitably normalized to correct for concentration differences.

Obtaining the Outer Product Matrix of Two Vectors

An analog representation of an outer product matrix $V_i W_j$ of a vector V having components $V_i$ for all i=1, 2, ... m, and a vector W having components $W_j$ for all j=1, 2, ... n, is provided by obtaining a set of single-stranded, dimeric oligomers of the form $\{E_i\}\{E_j\}$, $\{\underline{E}_i\}\{E_j\}\{E_i\}$, $\{\underline{E}_j\}$, and $\{\underline{E}_i\}\{\underline{E}_j\}$, each of which comprises a first single-stranded oligomer sequence $E_i$ or $\underline{E}_i$ representing the i-th component of V, and a second single-stranded oligomer sequence $E_j$ or $\underline{E}_j$ representing the j-th component of W, where the concentration of each of the different dimeric oligomers $\{V_i\}\{W_j\}$ is proportional to the product of the amplitudes of the vector components $V_i$ and $W_j$. The set of dimeric oligomers representing the outer product matrix $V_i W_j$ can be obtained by conventional methods. For example, the dimeric oligomers can be chemically synthesized, purified, and combined in the appropriate concentrations. Alternatively, oligomers representing vector components $V_i$ and $W_j$ can be individually synthesized, either chemically or enzymatically (using an polynucleotide polymerase), purified, joined (e.g., ligated) to form the dimeric oligomers, and then combined in the appropriate concentrations.

In a preferred embodiment, a set of dimeric oligomers representing the outer product matrix $V_i W_j$ is obtained by combining the oligomers corresponding to $V_i$ for l=1 to m with the oligomers corresponding to $W_j$ for j=1 to n in the presence of ligase enzyme under reaction conditions such that one end of the $V_i$ oligomers is covalently ligated to one end of each the $W_j$ oligomers. Oligomer ends are modified before the reaction, e.g., by de-phosphorylating the 5' ends of the $V_i$ oligomers and phosphorylating the 5' ends of the $W_j$ oligomers, to ensure that the oligomer pairs are ligated in the proper orientation.

The ligation reaction proceeds at a rate that is proportional to the product of the concentrations of the $V_i$ and $W_j$ oligomers; therefore, the concentrations of the dimeric oligomers $\{V_i\}$ $\{W_j\}$ produced by the reaction quantitatively represent the amplitudes of the components of the outer product matrix $V_i W_j$.

An outer product matrix that is formed as the product of a vector with itself can be represented in similar fashion. Where $W_j = V_j$, the resulting outer product $V_i V_j$ is represented by a set of dimeric oligomers, each of which comprises a copy of an oligomer sequence $E_i$ or $\underline{E}_i$ representing the i-th component of V and a copy of oligomer sequence $E_j$ or $\underline{E}_j$ representing the j-th component of oligomer of vector V, with the concentrations of each dimeric oligomer $\{V_i\}$ $\{V_j\}$ being proportional to the product of the amplitudes of the i-th and j-th components of vector V.

The set of single-stranded dimeric oligomers that represents an outer product matrix of vectors $V_i W_j$ or $V_i V_j$ does not include dimeric oligomers $\{E_i\}$ $\{\underline{E}_i\}$ formed by joining complementary oligomers, because the complementary oligomers hybridize to each other.

Obtaining the Inner Product of a Matrix and a Vector

An analog representation of the product of a matrix T and a vector V is provided by obtaining a set of single-stranded oligomers S that is an analog representation of the product of matrix T and vector V.

One embodiment provides a set of oligomers S representing the product of a matrix T and a vector V by:

(i) Obtaining a set of single-stranded oligomers representing a matrix T, wherein each matrix component $T_{ij}$ is a dimeric oligomer comprising a first oligomer sequence $E_i$ or $\underline{E}_i$, and a second oligomer sequence $E_j$ or $\underline{E}_j$. The concentrations of the dimeric oligomers $T_{ij}$ are proportional to the absolute values of the amplitudes of the matrix components. The dimeric oligomer sequences representing the matrix have the general form 5'-A-B-3' where the individual dimeric oligomers are of the form 5'-$\{E_i\}$ $\{E_j\}$-3', 5'-$\{E_i\}$ $\{\underline{E}_j\}$-3', 5'-$\{\underline{E}_i\}$ $\{E_j\}$-3', or 5'-$\{\underline{E}_i\}$ $\{\underline{E}_j\}$-3';

(ii) Obtaining a set of single-stranded oligomers $E_i$ and $\underline{E}_i$ representing the components of a vector V, for which the concentrations of oligomers $E_i$ and $\underline{E}_i$ are proportional to the respective positive and negative amplitudes $V_i$ of the vector components;

(iii) Obtaining a set of single-stranded oligomers $E_i$ and $\underline{E}_i$ representing the components of vector $\underline{V}$ that are complementary to the oligomers representing vector V. The relative concentrations of the oligomers that represent $\underline{V}$ are proportional to the concentrations of their complementary counterpart oligomers in V.

(iv) Combining in one reaction a sample of the oligomers representing matrix T with a sample of the oligomers representing vector $\underline{V}$ under conditions such that $\underline{V}$ oligomers stably hybridize with complementary oligomers $E_j$ and $\underline{E}_j$ representing the j-th column of $T_{ij}$, but do not stably hybridize with oligomer sequence $E_i$ or $\underline{E}_i$ representing the i-th row of $T_{ij}$, and isolating from the resulting double-stranded complexes the set of single-stranded oligomers corresponding to the i-th row of matrix $T_{ij}$, which represents the unchanged-sign contribution to the product;

(v) Combining in another reaction a sample of the oligomers representing matrix T with a sample of the oligomers representing vector V under conditions such that V oligomers stably hybridize with complementary oligomer sequences $E_j$ and $\underline{E}_j$ representing the j-th column component of $T_{ij}$, but do not stably hybridize with oligomer sequence $E_i$ or $\underline{E}_i$ representing the i-th row component of $T_{ij}$, and obtaining from the resulting double-stranded complexes the set of single-stranded oligomers complementary to the oligomers corresponding to the i-th component of matrix $T_{ij}$, which represents the changed-sign contribution to the product; and (vi) Adding the set of single-stranded oligomers from step (iv) that represents the unchanged-sign contribution to the product to the set of oligomers from step (v) that represents the changed-sign contribution to the product, to produce a set of single-stranded oligomers S that is an analog representation of the inner product of the matrix T and the vector V. In the set of oligomers S, the concentrations of the oligomers $E_i$ and $\underline{E}_i$ represent the components of the product TV and are proportional to the absolute values of the products of the corresponding amplitudes of the i-th components of vector TV.

In certain applications of the present invention, it may be desirable to obtain an analog representation of the inner product of a matrix T and a vector V by combining and manipulating oligomers representing the matrix and the vector, as described above. In other applications, one may already know the values of the components of a vector S that is the product of a matrix T and a vector V, and may wish to obtain a ready-made set of oligomers that is an analog representation of the vector S. Following the principles and methods described herein, a skilled artisan could readily employ commonly-used methodologies for obtaining oligomers of a selected nucleotide sequence, and then combine them in the appropriate concentrations to obtain a set of oligomers that is an analog representation of such a vector S.

Product of Two Matrices

An analog representation of the product of two matrices having both positive and negative components is provided by the present invention by appropriately combining the above-described method steps involving determining the outer product of two vectors, and adding two or more vectors. For example, an analog representation of multiplication of two matrices is provided by mixing sets of oligomers representing the row component of one matrix and a column component of the other matrix under conditions in which the oligomers representing one matrix are joined end-to-end with the oligomers representing the other matrix. Then, an analog representation of adding the products of the various matrix components together to obtain the amplitudes of the components of the product matrix is provided by determining the concentrations of the different dimeric oligomers produced during the "multiplication" step, e.g., by using hybridization probes complementary to the joined oligomers, and combining these values appropriately.

Input and Output Using a Hybridization Array

Figure 1:
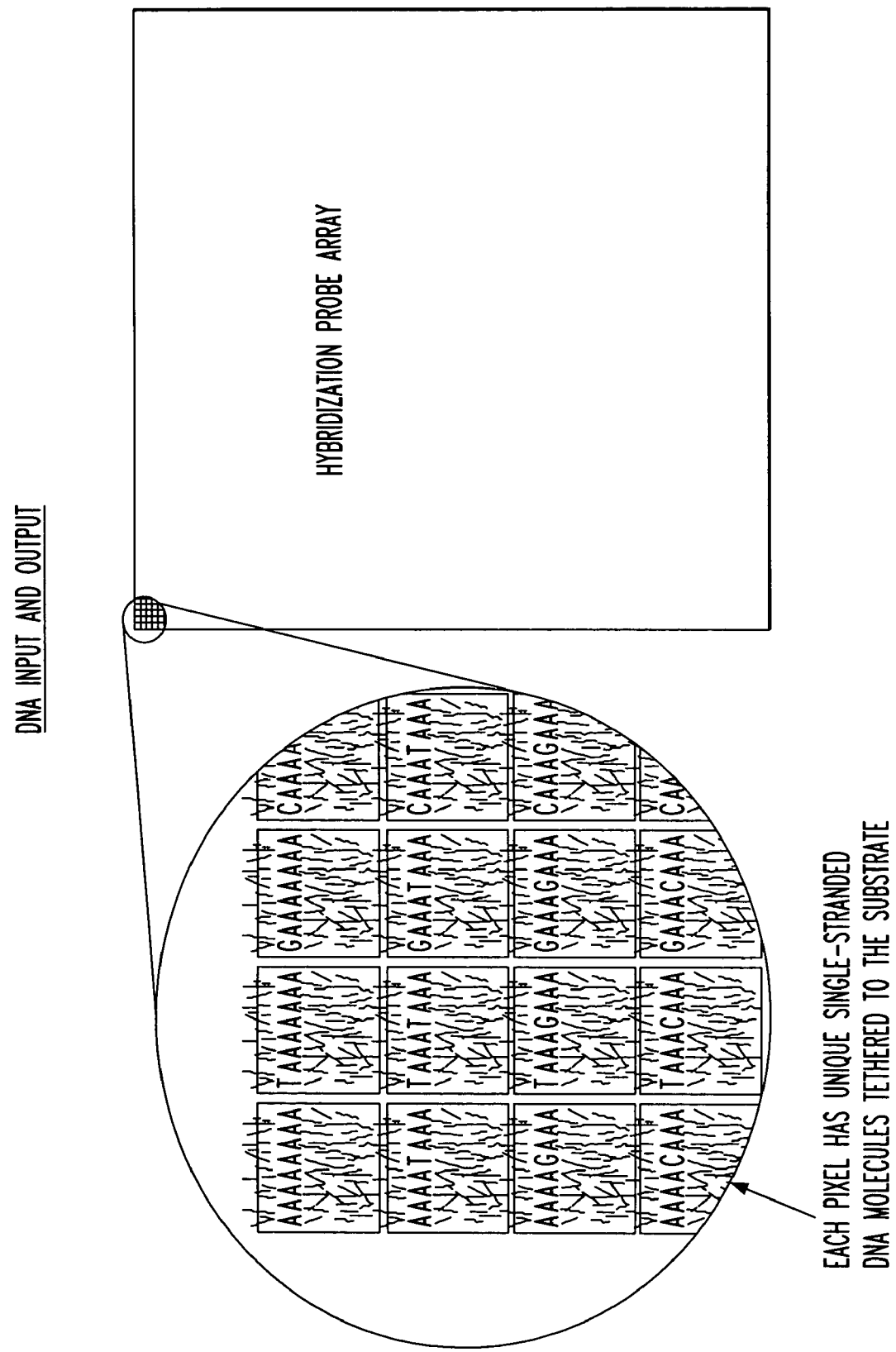
FIG. 1 shows a hybridization array that serves as an oligomer-storing device and comprises a substrate supporting an array of oligomer depot sites.

To make a practical DNA computer that is capable of performing vector and matrix operations, represented by the interactions of selected sets of DNA strands, one must interconvert a collection of DNA strands with a block of ordinary analog or digital data. Preferred methods for "writing" vector data as sets of DNA strands, and for "reading" sets of DNA strands to derive the vector data they represent, employ microarrays of DNA oligonucleotide hybridization probes attached to a solid substrate; e.g., DNA chips or DNA-coated microparticles. A standard DNA hybridization chip (see FIG. 1) presents a simple solution for providing the sets DNA strands representing positive and negative vectors, and for analyzing sets of DNA strands representing a solution. A DNA chip is currently available as an array of up to $10^6$ depot sites as small as 4 μm on a side, each of which is coated with a unique type of single-stranded DNA at a density of about $10^4$ molecules per μm$^2$. A chip with 2 m depot sites carrying the complete set of $E_i$'s and $\underline{E}_i$'s is suitable for various embodiments.

Figure 2:
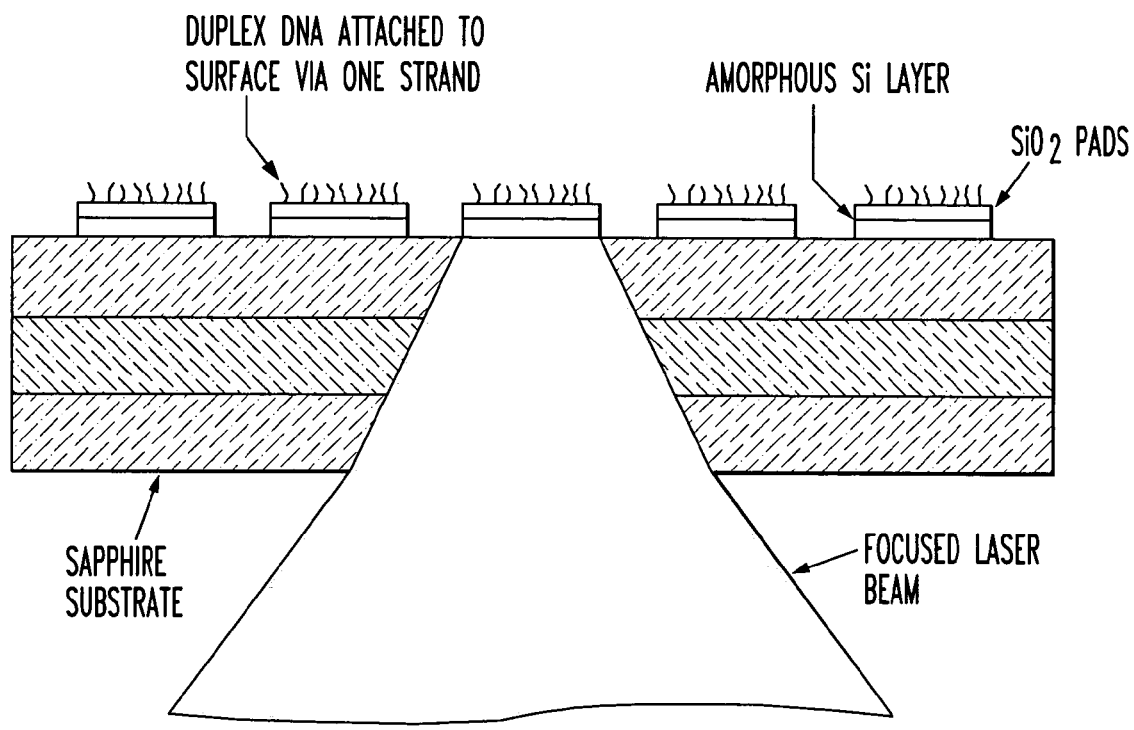
FIG. 2 is a cross-section through a row of depot sites of the oligomer-storing device shown in FIG. 1. In the device, localized heating of a selected depot is achieved by using a focused laser beam. Heating a selected depot site releases desired single-stranded oligomers.

A method for "writing" digital data corresponding to vector V as a set of DNA strands $E_i$ and $\underline{E}_i$ released from a DNA chip serving as an oligomer storing device is described in U.S. Pat. No. 6,150,102, the entire disclosure of which is incorporated herein by reference. The DNA strands tethered to an array of depot sites of a DNA chip are completely saturated with complementary strands, so that each tethered DNA strand is hybridized to its complementary strand. Double-stranded DNA complexes of selected oligomer-storing depot sites on the DNA chip are denatured, e.g., by localized heating, as shown in FIG. 2. Then, the desired soluble oligomers are collected from a solution that is in contact with the storage micro-array.

Figure 3:
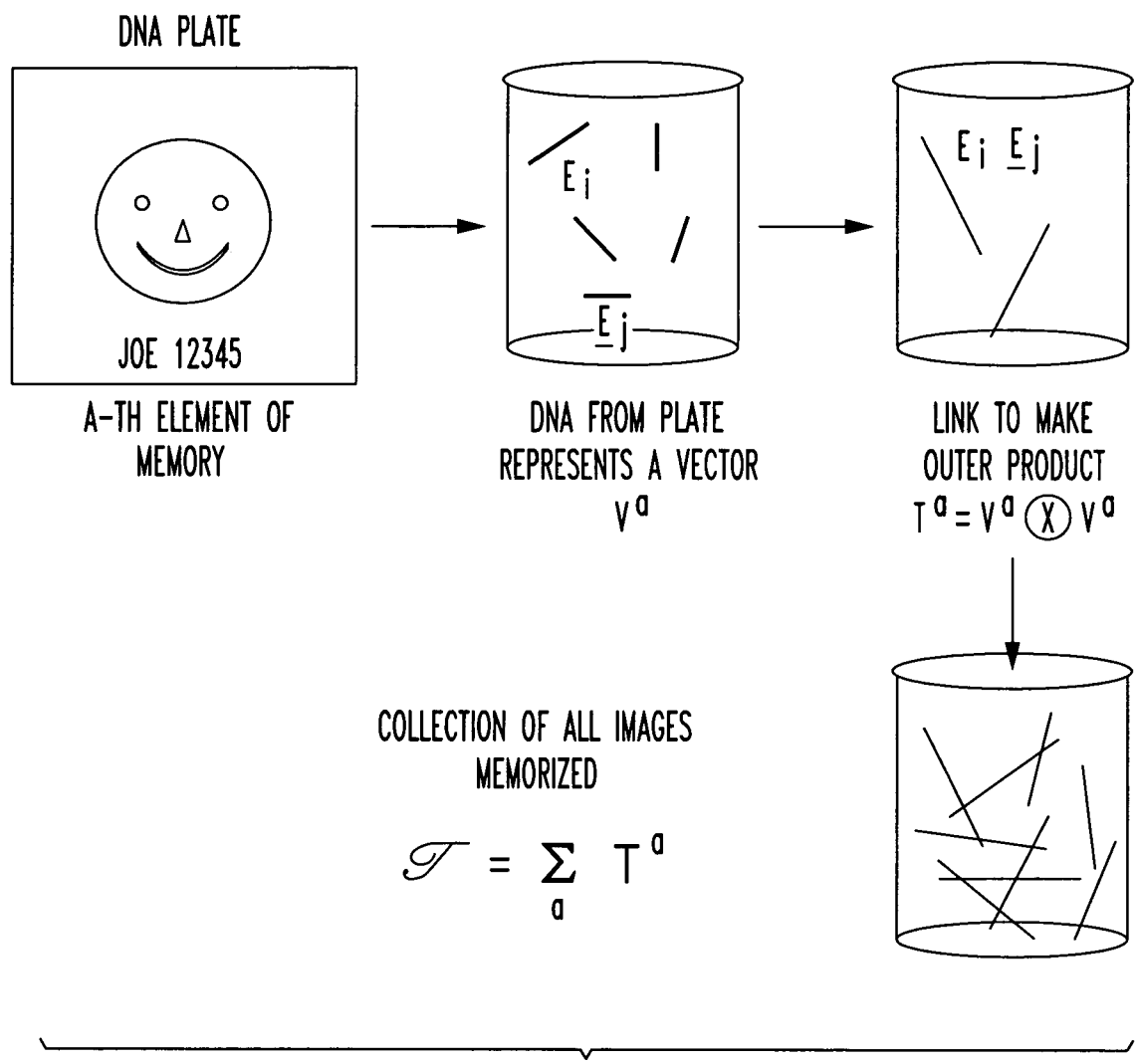
FIG. 3 schematically represents "writing" information from digital into analog form and storing it as an analog outer product memory matrix. Following exposure of a DNA-saturated substrate, e.g., a DNA chip, to an image, with selective denaturation of double-stranded complexes at the image pixels, the oligomers that represent the image are collected. The image data is formed into an outer product, and the DNA strands representing the images to be stored are pooled to give the sum of the outer products, which is the memory matrix $T_{ij}$.

The array of depot sites of a DNA chip is analogous to an array of "pixels" that define a digitized image. A set of DNA oligomers representing data vector $V^a$ corresponds to an image obtained from such a DNA chip by applying a "heat" image corresponding to the date vector $V^a$ on the chip. The number $n_i$ of single-stranded $E_i$ or $\underline{E}_i$ molecules that is released by the applied heat depends on the temperature-dependent rate of dissociation of the double-stranded DNA at the i-th pixel (see the first step of FIG. 3). By suitable calibration of the local heaters for the DNA chip, one or more bits of amplitude information could be encoded into the concentrations of each of the $E_i$'s and $\underline{E}_i$'s. The chip is washed following exposure to the image to collect the set of DNA oligomers representing the data vector $V^a$.

Digital information "written" into analog form by a set of DNA oligomers can be "read" by measuring the types and concentrations of oligomers present in the set, and then relating the measured types of oligomers with digital information. Preferred methods for "reading" sets of DNA strands employ microarrays of DNA oligonucleotide hybridization probes attached to a solid substrate, such as DNA chips supporting oligonucleotide arrays (see the last step of FIG. 4). The quantity of DNA oligomers captured at a depot site, or "pixel," of the micro-plate is proportional to the concentration of the DNA oligomers in solution, i.e., for a short exposure. Moreover, since the rate of hybridization of the soluble oligomers to tethered complements is proportional to the concentration, the set of soluble DNA strands can be amplified, e.g. by PCR, prior to hybridizing to the chip, in order to give a stronger signal.

Methods for making and using DNA oligonucleotide microarrays to detect and measure concentrations of specific sequences are well known in the art. For example, quantitative detection of oligomers that hybridize to specific depot sites on a DNA chip can be accomplished by exposing the micro-plate to a solution of ethidium bromide, and then detecting the fluorescence emitted by ethidium bromide bound to the double-stranded DNA molecules at various depot sites. Alternatively, the data set or set of depot sites with double-stranded DNA complexes can be obtained using other reporter molecules that emit an optical signal indicating double-stranded complexes. For example, a flourescent reporter group can be attached directly to the data oligomers prior to incubating with the DNA chip.

DNA-Based Analog Representation of a Neural Network

Various embodiments provide methods for DNA-based representations of neural networks that use the parallelism possible with nucleic acid computing. The invention implements neural networks using DNA oligomers or their analogs to represent positive and negative vectors as the neurons. Diffusion and hybridization of complementary oligomer sequences, together with nucleotide sequence-specific reactions of DNA-modifying enzymes, as employed in the analog vector operations discussed above, provide connections between neurons of the network. Hybridization of DNA oligomers of the network to one or more arrays of single-stranded DNA oligomers having selected nucleotide operates as a saturating function of the neural network, i.e., the function that generates an output signal.

The sequence-specific hybridization of complementary DNA strands provides representations of mathematical operations that provide a basis for molecular computation. Nevertheless, departures from the ideal selectivity of DNA hybridization can lead to undesired pairings of strands that could create difficulties in using DNA oligomers to implement large scale Boolean functions. Neural networks do not need the high precision associated with digital computing. Because they are fault-tolerant, the mathematical operations that underlie the operation of a neural network are suited to being represented by the rapidly-occurring, sequence-specific interactions of DNA molecules.

Implementation of a Hopfield Neural Network to Produce a DNA-Based, Content-Addressable Memory The present invention can be implemented as a DNA-based representation of neural network that operates as an associative, content-addressable memory. A complete stored data record can be recalled from the memory, even if only a small portion of the data record is known.

Elements of memory (e.g., data records or images) to be stored in the neural network are defined as m-component vectors $V = \Sigma V_i e_i$ in a space with basis vectors $e_i$ (i=1, 2, ... m), with each element of memory being represented by a set of the oligomers $E_i$ and $\underline{E}_i$ that are a subset of all single-stranded oligomers and are in 1:1 correspondence with the basis vectors $e_i$ for i=1 to m. Oligomers $E_i$ and $\underline{E}_i$ have complementary nucleotide sequences, with $E_i$ oligomers representing the i-th component of V for which the amplitude $V_i$ is positive, and $\underline{E}_i$ oligomers representing the i-th component of V for which $V_i$ is negative, and the concentration of each of oligomers $E_i$ and $\underline{E}_i$ is proportional to the absolute value of the amplitude $V_i$ of the i-th component of V.

(a) Storing Data in the Memory: The items of experience, a set of vectors $V^a$ (a=1, 2, ... s), are stored in the memory in the form of memory matrix $T_{ij}$ by summing the outer product matrices of the experience vectors:

$$T_{ij} = \Sigma_a V_i^a V_j^a. \qquad (3)$$

The outer product matrix $V_i^a V_j^a$ for each vector $V^a$ for a=1 to s is represented by a set of single-stranded, dimeric oligomers, each of which comprises a first single-stranded oligomer sequence selected from the group consisting of $E_i$ or $\underline{E}_i$ for each i-th component of $V^a$ for i=1 ... m, and further comprises a second single-stranded oligomer sequence selected from the group consisting of $E_j$ or $\underline{E}_j$ for each j-th component of $V^a$ for j=1 . . . m, except for i=j. Removal of all of the diagonal components, so that $T_{ij}=0$ for i=j, is required, along with symmetry, $T_{ij}=T_{ji}$, for unconditional stability of the recall algorithm. For example, the outer product matrix $V_i^a V^{ja}$, representing an element of memory (see FIG. 3), can be formed by using DNA ligase to join the single-stranded DNA oligomers comprising the nucleotide sequence corresponding to $V_i^a$ at their 3' ends to the 5' termini of the oligomers comprising the nucleotide sequence corresponding to $V_j^a$. The strands are allowed to join randomly, in a concentration-dependent reaction, so that the concentrations of the dimeric strands are proportional to the products of the concentrations of the two monomeric strands they contain. The sum of all such dimeric strands for each vector $V^a$ for a=1 to s becomes the memory matrix $T_{ij}$ of Equation 3. The strands corresponding to the diagonal components of $T_{ij}$ are removed, and what remains is a solution of dimeric oligomer strands basically of the form $E_iE_j$, $E_i\underline{E}_j$, $\underline{E}_iE_j$, and $\underline{E}_i\underline{E}_j$, with i≠j, the correlations of whose concentrations give the DNA representation of the memory matrix $T_{ij}$.

(b) Recalling a Data Record (e.g., an image) From Memory:

Recall from the memory of a particular data record $V_i^b$, incompletely represented by data set $U_i^b$, is effected by iteratively solving the non-linear equations $$V_i = S(\Sigma T_{ij} V_j), \qquad (4)$$

starting with $V_i=U_i^b$. Here, the function $S(x)$ is a saturating function, such as $\lambda \cdot \tan h(x)$, acting separately on each component of its vector argument. As used herein, a saturating function $S(x)$ is one of a class of functions $S(x)$ that are monotonically increasing with x and that have a maximum and a minimum value, respectively, for large and small values of x. Such functions include, for example, $\tan h(x)$, $x/\sqrt{a+x^2}$, $x/$nth root of $(a+x^n)$ where n is even, and the step function $S=-1$ for $x<0$, $S=1$ for $x>0$. The additional factor $\lambda$ represents the small-signal gain in exemplary saturation function $S(x)=\lambda \cdot \tan h(x)$. Typically, solutions to Equation 4 are found for a value of the small-signal gain $\lambda$ adjusted to facilitate convergence. If the $V_i^a$ are sufficiently different, i.e., are part of a nearly orthogonal set, the system will settle into a state closely resembling $V_i^b$. This necessitates having some negative amplitudes in the vector components and in the weight matrix $T_{ij}$. Hopfield found that the number of random memories that can be stored simultaneously using the learning algorithm of Equation 3 is roughly 10% of the number of independent basis vectors, i.e., s≈m/10, and that only a few iterations are required for convergence. Of course, if the $V_i^a$ constitute an orthogonal set, the number of memories s can be the same as m.

(1) To recall a data record $V_i^b$ that is incompletely represented by data set $U_i^b$, a set of oligomers representing $U_j^b$ is combined with the pool of dimeric oligomers representing memory matrix $T_{ij}$ under conditions such that oligomer sequences $E_j^b$ and $\underline{E}_j^b$ of data set $U_j^b$ hybridize specifically to complementary sequences $E_j$ and $\underline{E}_j$ present in the pool of dimeric memory oligomers. A set of monomeric oligomer strands $X_i$ comprising the oligomer sequences $E_i$ and $\underline{E}_i$ is then isolated from the subset of dimeric oligomers comprising sequences $E_j$ or $\underline{E}_j$ which hybridized specifically to the $U^b$ oligomers.

For example, dimeric memory oligomers may have a restriction enzyme cleavage site between the 5' end of $E_i$ and the 3' end of $E_j$. Oligomers representing $U_{ij}^b$ are hybridized with complementary the 3' $E_j$ portions of the dimeric matrix strands, and the double-stranded complexes are then cleaved with a restriction enzyme that recognizes the central portion of the DNA sequence. The single-stranded oligomers comprising sequences $E_i$ and $\underline{E}_i$ from the 5' ends of the memory oligomers are collected, and their concentrations represent the vector $\Sigma_j T_{ij} U_j^b$.

(2) To implement the saturating function $S(\Sigma_j T_{ij} U_j^b)$, the set of $X_i$ oligomers obtained as described in (b) above is combined with a sub-stoichiometric set of single-stranded saturating oligomers comprising a set of $E_i$ and $\underline{E}_i$ oligomers representing the complete set of basis vectors $e_i$. As used with regard to the present invention, the statement that saturating $E_i$ and $\underline{E}_i$ oligomers are sub-stoichiometric relative to the set of $X_i$ oligomers means that the number of $X_i$ oligomers for at least one basis vector $e_i$ is greater than the number of $E_i$ or $\underline{E}_i$ saturating oligomers corresponding to basis vector $e_i$. The $X_i$ oligomers are allowed to hybridize to complementary saturating oligomers, and excess $X_i$ oligomers are removed. The resulting double-stranded oligomer molecules are denatured, and the subset of $X_i$ oligomers that hybridized specifically to said $E_i$ and $\underline{E}_i$ sequences is isolated to obtain a set of saturated $X_i$ strands, $S(X_i)$.

For example, the oligomer strands representing vector $X^i=\Sigma_j T_{ij} U_j^b$ can be captured on a sub-stoichiometric complete set of tethered E's and $\underline{E}$'s using a hybridization chip. After hybridization of the $X_i$ oligomers with the tethered strands, the array is washed to remove the excess $\Sigma_j T_{ij} U_j^b$ strands, which are discarded. The collection of DNA strands representing the saturated function $S(\Sigma_j T_{ij} U_j^b)$ is obtained by melting the hybridized strands from the array and collecting the strands released. The resulting solution is the DNA representation of the first iteration of Equation (4), which is presumably approaching one of the initial memorized vectors $V_i^b$ (see FIG. 4).

(c) Steps (b)(1) and (b)(2) above describe one full computation cycle of a DNA-based implementation of Equation (4). It is possible to stop after one iteration and read the solution representing the vector $S(\Sigma_j T_{ij} U_i^b)$. Alternatively, one can repeat steps (b)(1) and (b)(2) iteratively, using the set of saturated $X_i$ strands, $S(X_i)$ obtained in each previous implementation of step (b)(2) as the set of oligomers representing imperfect data set $U_i^b$ employed in the subsequent implementation of step (b)(1), until satisfied that successive iterations yield the same or substantially the same set of oligomer strands $X_i$ that represents data set $V_i^b$.

The hybridization reactions associated with forming the products of $T_{ij}$ and $U_j^b$ or $X_j$ are preferably carried out using concentrations of $U_j^b$ and $X_j$ oligomers that are 1-4 times as great as the concentration of the $T_{ij}$ oligomers, in order to reduce the time required for the hybridization reaction. Applying the saturating function to $X_i$ may include amplifying the DNA strands representing $U_j^b$ and $X_i$, e.g., by PCR, prior to the steps of forming the products of $T_{ij}$ and $U_j^b$ or $X_j$, or prior to applying the saturating function to $X_i$, in order to increase the rates of hybridization. Increasing the copy number of the $X_i$ oligomers by PCR amplification, or changing the concentration of $X_i$ oligomers required to saturate the binding sites on the hybridization plate, e.g., by altering the number of complementary oligomers tethered to the pixels of the DNA chip, corresponds to adjusting the small-signal gain parameter $\lambda$ of the saturating function.

(d) "Reading" the data recalled from the memory matrix: A preferred embodiment of the reading step involves exposing a DNA hybridization chip containing the complete set of 2 m types of single-stranded $E_i$'s and $\underline{E}_i$'s to a liquid sample containing the set of oligomer strands $X_i$ that represents data set $V_i^b$. The amounts of DNA oligomers captured at locations on the chip are proportional to the concentrations of the oligomers in solution. The captured amounts of various oligomers are then quantitated by known means.

Sample Volume

The amounts of DNA needed for faithful retrieval of an image from a memory matrix can be estimated. The memory matrix $T_{ij}$ has $m^2$ different dimeric oligomer components, where m is the number of independent basis vectors. If each component of the outer product of a single-memory vector that is generated in the process of accumulating memories is represented by an average of t molecules, and if s is the number of memories (i.e., outer product records $V_i^a V_j^a$) that is stored, the total memory matrix will consist of $m^2$st different dimeric oligomer sequences.

For example, let the number of basis vectors m equal $10^7$, and s, the number of memories, be $10^4$; a sample of memory matrix $T_{ij}$ containing 10 copies of the set of oligomers representing an outer product memory contains $10 \times 10^4 \times (10^7 \times 10^7) = 10^{19}$ different DNA strands. If the dimeric memory oligomers are 80-mers, the sample would contain $8 \times 10^{20}$ nucleotides. The volume of such a sample of memory $T_{ij}$ for which the nucleotide concentration is 1 M is about 1.3 ml.

If m equals $10^8$, and st is approximately equal to m; then the total memory matrix will consist of about $m^3$ DNA oligomers, or about 1 mole of DNA. Since the maximum practical concentration of bases is about 1 M and the molecules of $T_{ij}$ are about 80-mers, this translates into about 80 liters of solution. However, an accurate solution of Equation (4) requires use of only a small part of an 80-liter library. Under conditions favoring rapid hybridization; e.g., in solution containing 1 M sodium ion, at a temperature that is about 25° C. below the melting point of the DNA, the cycle time would be of order hours. One would need about 100 μmoles of DNA in each step, and the memory capacity would be $ms = 10^{14}$ bits, nearly equal to the capacity of the human brain. A DNA neural network can thus have enticingly large capacities and not unduly long cycle times using reasonable scale chemical operations.

Query Time

Although the network involves many operations acting in parallel, the times for the steps of a complete network cycle to be carried out using current technology are not particularly fast. The various chemical operations, such as separation via gel electrophoresis, litigation, and cutting via a restriction enzyme, presently require times $t_{min}$ of the order of an hour for completion. It seems reasonable that $t_{min}$ might be reduced to less than $10^3$ seconds after some development. To this minimum time is added the query time of the neural network algorithm determined by the matrix multiplication step, which depends on the rate of forming double-stranded DNA oligomers from the single-stranded oligomers representing the $T_{ij}$ matrix and vectors of Equations 3 and 4. The rate of hybridization of complementary single-stranded DNA molecules is proportional to the total nucleotide concentration and inversely proportional to the amount of unique nucleotide sequence in the DNA, and is dependent on the ionic strength and temperature. Under a given set of temperature and ionic strength conditions, the hybridization rate can be predicted with fair accuracy when the number of copies of each DNA present in the solution are known. For example, for a solution containing $10^7$ different double-stranded nucleotide sequences and having a total nucleotide concentration=1 M, with temperature and ionic strength selected to favor rapid hybridization, the time required for one-half of the strands to re-hybridize following denaturation is of the order of about 600 seconds. Computation speed is discussed in greater detail in the following section.

Computation Speed of a DNA-Based Neural Network

The hybridization of a collection of DNA strands with a set of complementary strands involves the operation of molecular recognition that is the basis for any DNA computation. The hybridization reaction may be studied to understand the factors limiting the speed of this form of molecular computation. Let $C_{AB}(t)$ be the concentration at time t of duplex strands AB, with $C_{AB}(0)=0$ and $C_A$ and $C_B$ being the initial concentrations of the complementary q-mer strands A and B. The two types of strands are mixed at time t=0 in stoichiometric proportions, $C_A = C_B$. The concentration of duplex strands as a function of time is then:

$$C_{AB}(t)/C_A = k_1 C_A t \{1 + k_1 C_A t\}^{-1}, \qquad (5)$$

$k_1$ being the association constant for the hybridization reaction. The dissociation rate $k_{-1}$ is assumed to be negligible compared to the initial association rate:

$$\gamma_A = k_1 C_A. \qquad (6)$$

The maximum practical concentration of DNA bases is $C_{max} \approx 1$ M, so that $C_A \leq C_{max}/2q$, where q is the number of bases in strand A. The maximum initial total number of molecules associating per unit of time per unit volume $\Gamma_{max}$ is then:

$$\Gamma_{max} = k_1 [C_{max}(2q)^{-1}]^2 N_A \qquad (7)$$

where $N_A = 6 \times 10^{23}$ (Avagadro's number). Taking $k_1 \approx 10^7$ M$^{-1}$ s$^{-1}$ at 30° C. and 1 M NaCl, the maximum rate of successful oligomer hybridizations per unit volume is $\Gamma_{max} \approx 1.5 \times 10^{30}$ q$^{-2}$ l$^{-1}$ s$^{-1}$. With oligomer length $q \approx 10^2$ nucleotides, this represents more operations per liter in a minute than the sum of all the operations ever done by all the silicon computers in the world.

Practical implementation of DNA-based computations often involves the association of a set of m mutually noninteracting strands $E_i$ and their complements $\underline{E}_i$. The concentrations of individual oligomer strand $E_i$ and $\underline{E}_i$ in the total pool of oligomers are of order $C_i \approx C_{max}/[2qm]$. For the case when all oligomer strands $E_i$ and $\underline{E}_i$ are present in equal amounts in the total oligomer pool, the total rate of successful molecular associates per unit volume in this elemental form of computation is thus reduced by a factor of m:

$$\Gamma_{max}(m) = k_1 [C_{max}(2q)^{-1}] N_A m^{-1}. \qquad (8)$$

Under the conditions described above, for a set of m different, single-copy oligomers, the maximum rate of successful oligomer hybridizations per unit volume is $\Gamma_{max}(m) = 1.5 \times 10^{30}$ m$^{-1}$ q$^{-2}$ l$^{-1}$. Even with this restriction, the computation rate appears to be larger than $100 \times 10^{12}$ floating point operations ("100 teraflops") per liter for data sets smaller than $m = 10^{12}$ different oligomers, which is comparable to the largest single silicon computer ever.

Certain computations, however, will require that the molecular associations proceed to near completion (e.g., to 50% or more), so that $\gamma_i t_{max} \approx 1$ after the maximum time $t_{max}$ allowed for the computation. When the reaction proceeds to about 50%, we rewrite this condition as $$k_1 C_{max}(2mq)^{-1} ]t_{max} \approx 1, \qquad (9)$$

or $$m \approx k_1 C_{max}(2q)^{-1} ]t_{max}. \qquad (10)$$

Allowing a one-day computation time limit [$t_{max}=10^5$ s], we then find $m<5\times10^9$, given $q=10^2$. The formula for the maximum computing rate is unchanged, of course, but its deceptively large number for such a small value of m means that there is much redundant computing going on in a liter computation volume.

We now consider the archetypical neural network operation, the analog DNA matrix product with a vector: double-length strands made from two basic strands $E_i$ and $E_j$ are allowed to hybridize with a complementary set of single-length strands. The actual volume containing a non-redundant computation is roughly the volume that would contain $m^2$ molecules, $$\Omega = 2m^2 q/[C_{max} N_A] \approx 8 \text{ ml} \qquad (11)$$

for the conditions being considered in the previous paragraph. The resulting computation rate is now simply $$\Gamma = m^2/t_{max} = mk_1 C_{max}(2q)^{-1} = 2.5\times10^{14} s^{-1}. \qquad (12)$$

This is a comparatively low rate, given the difficulties involved and the availability of multi-teraflop silicon machines. By testing a collection of strands for one characteristic at a time, one may do a complex search in a time that is short compared to the time required for hybridizing the collection directly, thus achieving the equivalent of $10^{18}$ operations per second. For the neural network, we envision dividing a problem into $n^2$ smaller problems of dimension m/n, which are to be carried out in parallel (see Eq. 6). For a fixed allotted time $t_{max}$, the dimension may thus be increased by a factor of n, $m_{tot}=nm$, and the total computation rate increases by the factor $n^2$. We assume that values of n of order $10^2$-$10^3$ would be practical using fluidic, robotic, or electrophoretic techniques, and would thus permit DNA computations far larger than any silicon machine. Each of the sub-computations may now be done in a volume $$\Omega = 2m_{tot}^2 q/[n^2 C_{max} N_A] \approx 1 \text{ µl} \qquad (13)$$

where we have taken $n=10^3$, $m_{tot}=5\times10^{10}$ and $t_{max}=10^3$ sec. The total computation rate becomes $$\Gamma = m_{tot}^2/t_{max} = 2.5\times10^{18} s^{-1}, \qquad (14)$$

and a neural network with these properties would have a capacity of $10^4$ human brains and a cycle time on the order of an hour.

Feed-Forward Neural Networks

A multilayer feed-forward network with sigmoidal neuron response functions, for example $S(x)=\tan h(x)$, and at least one hidden layer of neurons, is able to represent at its output any continuous function of its inputs. Such a network can be trained on known input-output pairs by the back-propagation of errors using an algorithm that is written in the language of matrix algebra. A useful neural network of this type may thus be implemented with the analog vector algebra scheme outlined above; the learning algorithm involves multiplication by the derivative of the response function. Such a learning algorithm can be implemented by a network with one hidden layer with neuron outputs denoted $H_i$, an input layer with outputs $I_i$ and an output layer with outputs $O_i$, wherein the input and hidden layers are connected by weights $A_{ij}$, and the hidden and output layers are connected by weights $B_{ij}$. For a network with a single hidden layer containing m neurons, and an output layer containing w processing units, the equations for the network are thus $$H_i = S\left(A_{0i} + \sum_{j=1}^{m} A_{ij} I_j\right) \text{ and} \qquad (15)$$

$$O_i = S\left(B_{0i} + \sum_{j=1}^{w} B_{ij} H_j\right). \qquad (16)$$

$A_{0i}$ and $B_{0i}$ are the bias weights for the $i^{th}$ hidden unit and the $i^{th}$ output unit, respectively, and are usually negative; thus, the bias weight acts as a threshold—the activity of the $i^{th}$ neuron is only positive when the sum of the incoming weighted signals is larger than the value of the bias weight.

Figure 5:
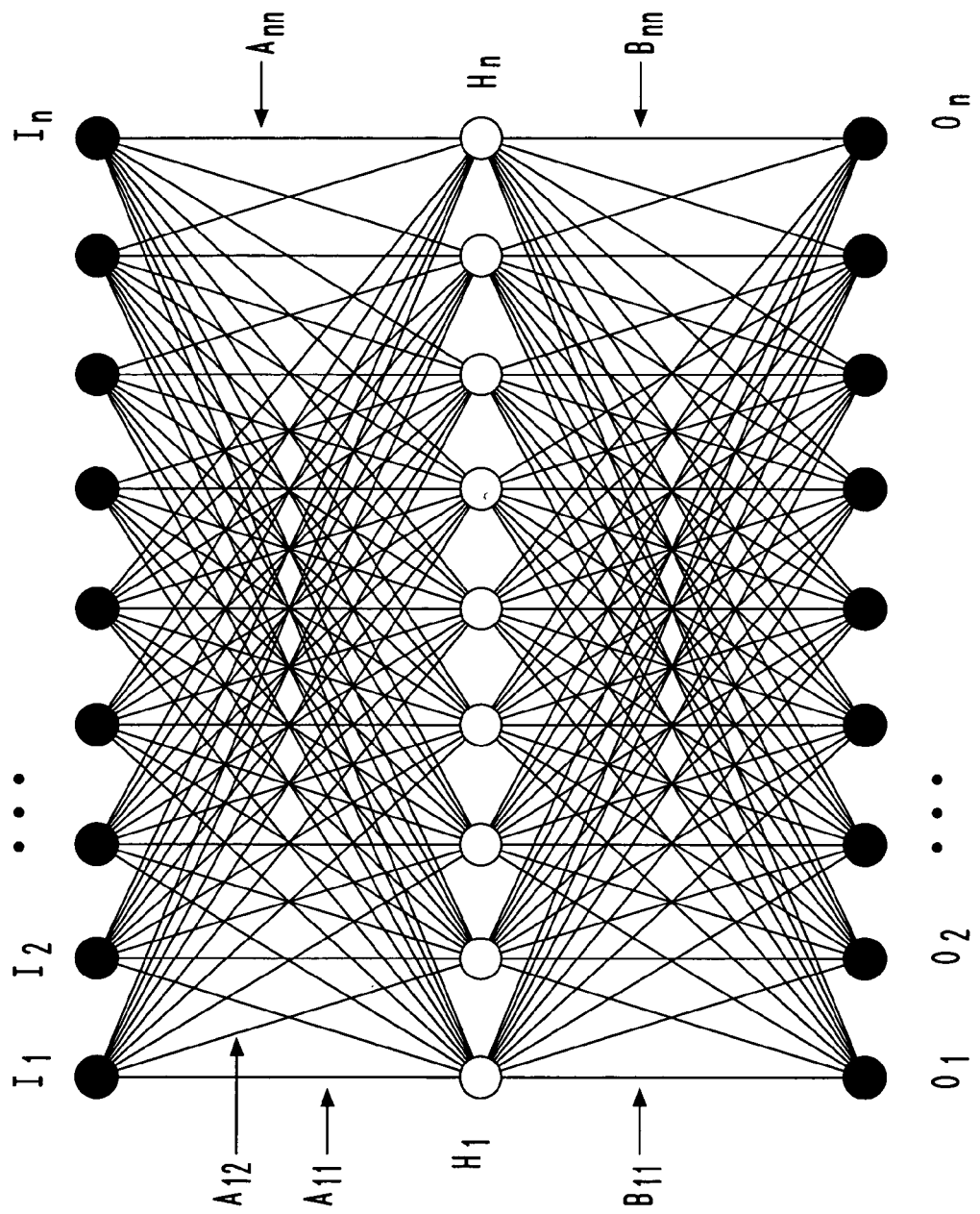
FIG. 5 schematically represents a feed-forward neural network having a single hidden layer. From top to bottom, the network comprises inputs I, the neurons H of the hidden layer, and the processing units O of the output layer. The formulas for obtaining the magnitude $H_i$ of the signal generated by the i-th neuron, and the magnitude $O_i$ of the signal generated by the i-th output unit, are shown below the network.

A feed-forward neural network with a single hidden layer is represented in FIG. 5. The lines connecting each component $I_j$ of the input vector to each neuron $H_i$ of the hidden layer represent the weighted signals $A_{ij} I_j$ received at each hidden layer neuron. A non-linear activation-output function, referred to herein as the saturation function, is applied to the sum of the weighted signals received at each hidden layer neuron to determine the magnitude of the signal sent by that neuron to each output processing unit. The signals sent by each neuron to each output processing unit are represented in FIG. 5 by the lines connecting each hidden layer neuron to each output $O_i$. FIG. 5 depicts a feed-forward neural network in which the input data, hidden layer neurons, and output units each have the same number of components; however, the present invention can be used to successfully represent neural networks for which the number of input components, hidden layer neurons, and output units are not the same. In the field of applying neural networks in analyzing medical data to provide diagnosis or prognosis of a patient, it is common to employ feed-forward neural networks that are multilayer perceptrons (MLPs) having 5 to 30 or more input variables, 2 or more hidden layers, each having 2 to 40 neurons, and 2 or more output units. The methods of the present invention can readily be used to represent such neural networks. In fact, the parallelism afforded by Watson-Crick base-pairing of nucleic acid oligomers permits the methods of the present invention to be employed to represent a MLP having hundreds of input components, hidden layer neurons, and output units, if such a neural network was called for.

Implementing a DNA-Based Analog Neural Network

A. Weight Oligomers

Figure 6:
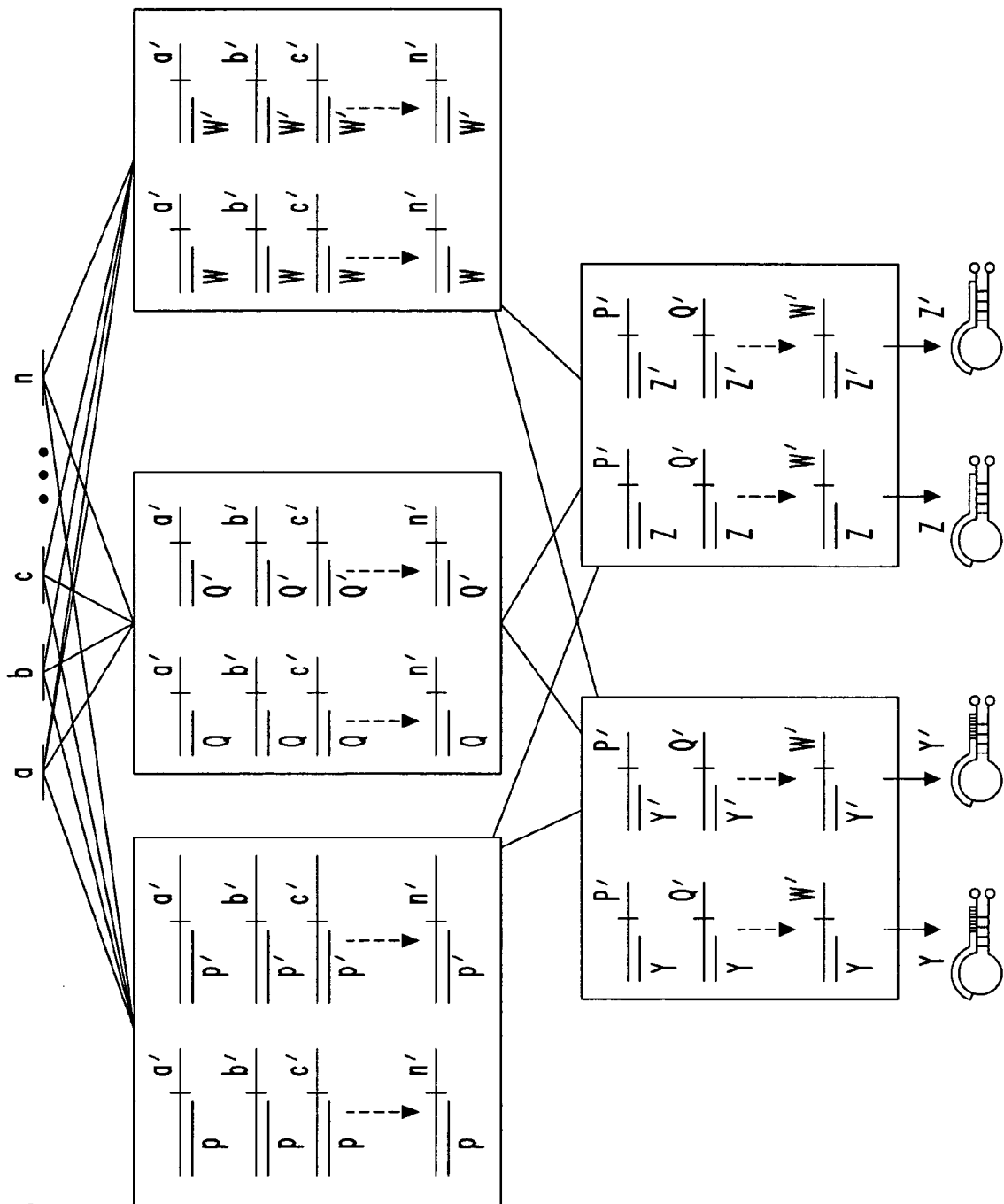
FIG. 6 schematically represents the sets of weight oligomers used to implement a DNA-based ANN. A set of signal oligomers p, p' q, q', ... w, w' is generated by hybridization of the input oligomers a, b, c, ... n to the $E_i$ or $\underline{E}_i$ receptor portions of the weight oligomers in each of the neurons of the hidden layer. After the saturation function is applied to the signal oligomers from the hidden layer, a set of signal oligomers y, y', z, or z' is then generated by hybridization of the hidden layer oligomers p ... w' to the $E_i$ or $\underline{E}_i$ receptor portions of the weight oligomers in each of the output units. The signal oligomers from the output oligomers are then saturated and allowed to bind to molecular beacons to provide a result.

Associated with each hidden layer neuron is a set of n weight values that are applied to the n input signals received by that neuron. The n weight values of each neuron are represented by a set of 2n different weight oligomers, each of which comprises at least one single-stranded receptor oligomer portion comprising a sequence complementary to one of the 2n different input $E_i$ and $\underline{E}_i$ oligomers, and at least one signalling oligomer portion, as shown in FIG. 6. The weight oligomers are configured such that hybridization of an input $E_i$ or $\underline{E}_i$ oligomer to a receptor oligomer portion can generate production of at least one single-stranded signal oligomer that either has the same sequence as, or is complementary to, the at least one signalling oligomer portion of the weight oligomer. In a preferred embodiment, the weight oligomers are configured so that each hidden layer neuron generates a different pair of signal $E_i$ and $\underline{E}_i$ oligomers. The number of different single-stranded signal oligomer sequences that can be generated by such a hidden layer having m neurons is therefore 2m; however, since complementary $E_i$ and $\underline{E}_i$ signal oligomers will "cancel out" by forming duplex structures, no more than m different signal oligomer sequences would be received by the next layer from such a hidden layer of m neurons.

B. Generation of Signal Oligomers

Figure 7:
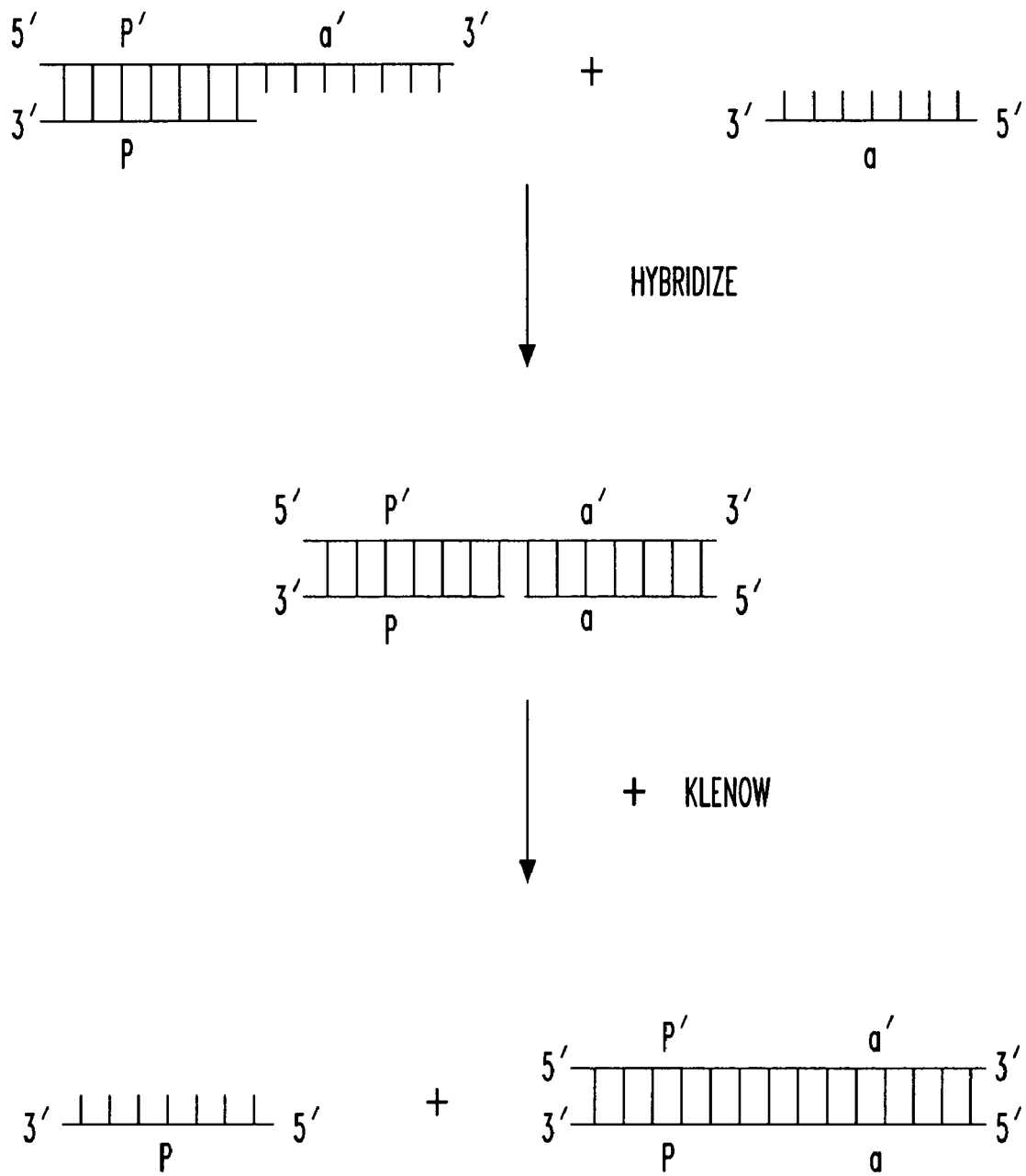
FIG. 7 schematically represents a weight oligomer comprising a single-stranded receptor portion a' and a double-stranded signaling portion p/p'. The series of operations depicts hybridization of an input oligomer a to receptor portion a', followed by Klenow fragment-mediated generation of a signal oligomer p by displacement during strand extension.

A preferred embodiment of a weight oligomer comprising a single-stranded receptor oligomer portion a', and a double-stranded signaling portion comprising complementary oligomer strands p and p', is shown in FIG. 7 as an illustrative example. Input oligomer a hybridizes to receptor portion a' to form a double-stranded complex that generates the single-stranded oligomer p (by displacement) in the presence of a polymerase such as Klenow fragment of DNA polymerase I and nucleotide triphosphates. One skilled in the art can provide various alternative weight oligomer configurations that function in a similar fashion. For example, the signaling portion shown in FIG. 7 could comprise two or more signal oligomers that are displaced during strand extension.

Figure 8:
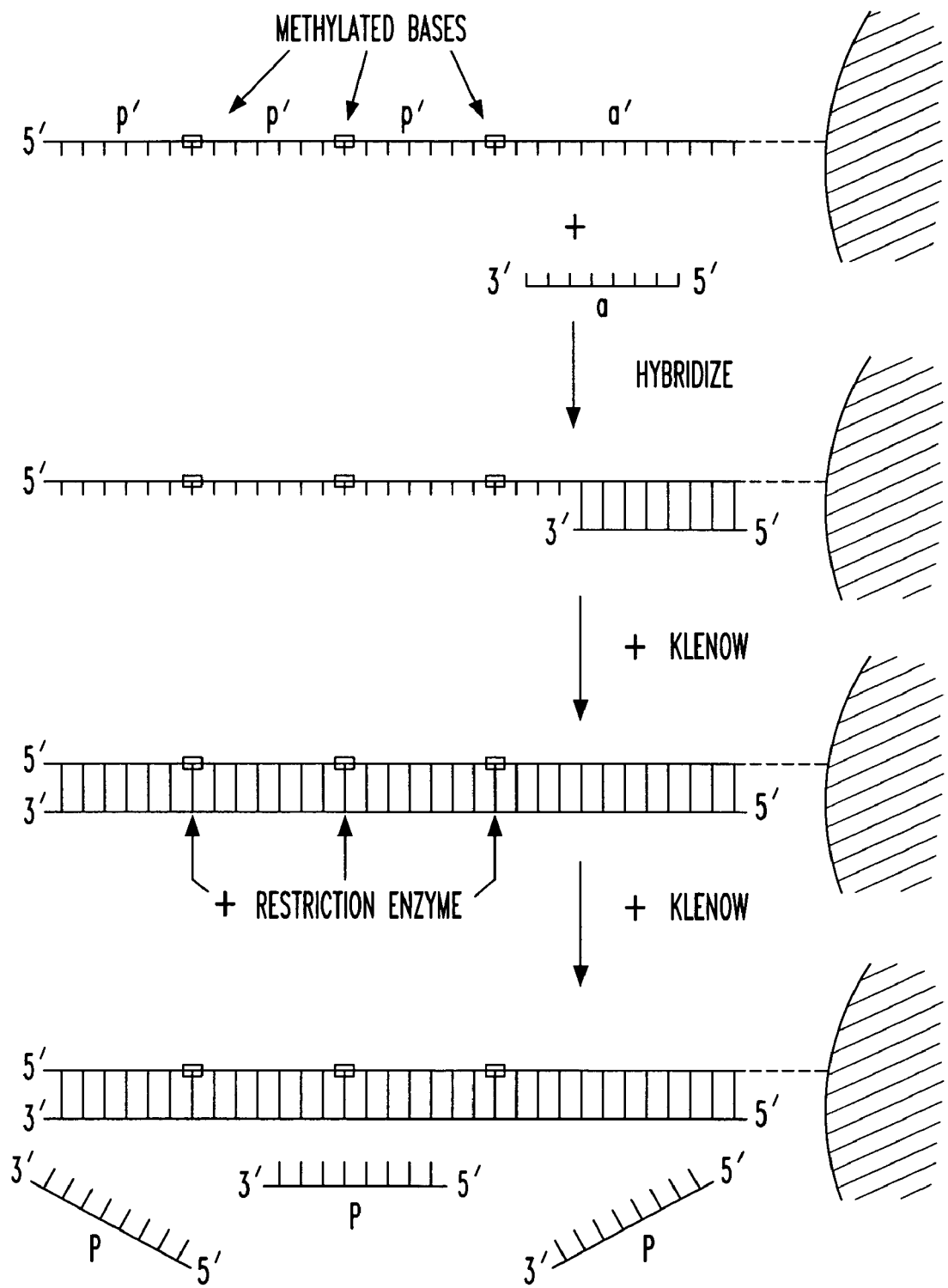
FIG. 8 schematically represents a microsphere-tethered, single-stranded, weight oligomer comprising a receptor portion a' and a signaling portion having three identical signaling oligomers p. The series of operations depicts hybridization of an input oligomer a to receptor portion a', asymmetric restriction enzyme cleavage between the oligomers, and Klenow-fragment-mediated generation of signal oligomers p by displacement during strand extension.

Alternatively, the weight oligomer can be a single-stranded oligomer comprising a receptor portion a' at one end, and a signaling portion at the other end comprising one or more p' sequences, each separated from the others by restriction enzyme cleavage sites containing methylated bases for assymetric cleavage, as shown in FIG. 8. Multiple copies of signal oligomer p are generated when input oligomer a hybridizes to receptor portion a' and is extended by polymerase, using the signalling portion as template, and the newly synthesized strand is cleaved by restriction enzyme at the hemi-methylated restriction sites.

Regardless of how they are configured, the weight oligomers are preferably tethered to a solid support such as a DNA chip or chromatographic matrix, and more preferably, to soluble microparticles, beads, or microspheres, to facilitate their separation from unhybridized input oligomers, and from the released signal oligomers.

C. Generating a Signal from the First Layer of Neurons

The ANN is activated by hybridizing a set of input oligomers to a set of hidden layer weight oligomers, and generating a set of signal oligomers. Initially, the rate of hybridization of input oligomers to weight oligomers will be proportional to the product of the oligomer concentrations. Therefore, the set of signal oligomers generated by hybridization of a relatively small fraction of the input oligomers to the weight oligomers of the $i^{th}$ neuron provides a reasonably accurate analog representation of the term:

$$\sum_{j=1}^{m} A_{ij} I_j$$

in equation (15) above. Preferably, signal oligomers are collected when hybridization of input oligomers to weight oligomers has proceeded about 1% to 20%; more preferably, 1% to 10%, and most preferably, about 1% to 5% to completion.

D. Applying a Saturation Function

An analog representation of a non-linear saturation function is provided by allowing the set of $E_i$ and $\underline{E}_i$ strands collected as signal oligomers for the hidden layers to hybridize with a set of single-stranded saturation oligomers comprising a complete, sub-stoichiometric set of hidden layer $E_i$ and $\underline{E}_i$ strands so that complementary sequences hybridize to each other, denaturing the resulting duplex molecules, and isolating the subset of signal oligomers that hybridized specifically to said saturation oligomers, to obtain for each neuron a set of saturated, single-stranded signal oligomers corresponding to $H_i$ of equation (15), the signal sent by the $i^{th}$ neuron to each output processing unit. Complementary $E_i$ and $\underline{E}_i$ signal oligomers, representing positive and negative amplitude values of the same vector component will hybridize to each other to form double-stranded oligomers, thereby "canceling each other out." Application of the saturation function imposes an upper limit on the number of oligomers of any one type which can be in a set of oligomers which represents a signal.

The signal oligomers corresponding to each of the m hidden layer neurons can be generated and saturated separately, to give up to m different types of saturated signal oligomers, each in a separate container, which can be pooled for hybridizing to the next layer of the ANN. Alternatively, the oligomers can be pooled so that the signal oligomers of the m hidden layer neurons are generated and/or saturated as a group to yield a mixture containing up to m different types of saturated signal oligomers.

As for the associative memory described above, the single-stranded saturation oligomers of a feed-forward neural network are preferably tethered to a solid support such as a DNA chip or chromatographic matrix, and more preferably, to soluble microparticles, beads, or microspheres.

If the feed-forward neural network is a single-layer perceptron (SLP), the saturated signal oligomers generated by the first layer of neurons represents the output of the ANN. An SLP has limited utility for recognizing a complex pattern in a set of input data; whereas a multilayer perceptron (MLP) with one or more hidden layers having a sufficient number of hidden units can approximate a mapping of any smooth function to an arbitrary degree of accuracy. Therefore, it is generally preferable to implement an ANN comprising two or more sets of weight oligomers that represents an MLP with two or more layers of processing units.

E. Passing the Signal to the Second Layer

When the feed-forward neural network is an MLP with a single hidden layer, the second layer of processing units is the output layer. The processing units of the output layer receive signals from the hidden layer and generate a set of output signals in response, in much the same manner that the neurons of the hidden layer receive and respond to the input signals. Associated with each processing unit of the output layer is a set of m weight values that are applied to the m signals received from the hidden layer by that unit. The m weight values of each output layer unit are represented by a set of 2m different weight oligomers which function in the same manner as those of the hidden layer. Thus, when a signal $E_i$ or $\underline{E}_i$ oligomer received from the previous layer hybridizes to least one receptor portion of the weight oligomer, at least one single-stranded signal oligomer is generated that has the same sequence as, or is complementary to, the at least one signalling oligomer portion of the weight oligomer. See FIG. 6. In a preferred embodiment, the weight oligomers of the output layer are configured so that each unit generates a different pair of signal $E_i$ and $\underline{E}_i$ oligomers. Since complementary $E_i$ and $\underline{E}_i$ signal oligomers hybridize and "cancel each other out," no more than w different output oligomer sequences are generated from such an output layer of w units.

E. Saturation of the Output

Depending on the nature of the problem to be solved, for some implementations of an oligomer-based ANN, the sequences and concentrations of the signal oligomers that represent the output may yield the desired information without first having the saturation function applied. In such cases, the sequences and concentrations of the signal oligomers can be determined without undergoing saturation. When saturation is required, the set of $E_i$ and $\underline{E}_i$ strands collected as signal oligomers for the output layers are saturated by hybridization with a set of single-stranded saturation oligomers comprising a complete, sub-stoichiometric set of the output $E_i$ and $\underline{E}_i$ strands, as described above for saturation of the hidden layer signal oligomers, so as to obtain a set of saturated, single-stranded output oligomers corresponding to $O_i$, of equation (16).

F. Implementing an MLP with Two or More Hidden Layers

When the feed-forward neural network is an MLP with two or more hidden layers, the steps for obtaining a set of saturated signal oligomers corresponding to $H_i$ of equation (15) for each neuron of a given hidden layer are essentially the same as those described above for the first hidden layer and the output layer.

G. Detecting the Output

The sequences and concentrations of the output oligomers can be determined by any of the methods for detecting and quantitating nucleic acids having specific nucleotide sequences that are well-known and routinely used by those skilled in the art. Such methods include detection and quantitation using DNA oligonucleotide microarrays.

H. Training the Neural Network

An neural network is a parallel, distributed, information-processing system that develops its functionality in response to exposure to information. Like a biological system, an ANN adapts its function according to the information presented to it during training so that it acquires the ability to detect or recognize one or more coherent pattern in complex input data. The aim of the training process is to identify values for the weights $A_{ij}$, $A_{0i}$, $B_{ij}$, and $B_{0i}$ that enable the network to accomplish its task. The values for the weights are chosen through a training process that identifies those weights that best approximate the mapping $(I_1, I_2, I_3 \ldots I_N) \Rightarrow y$ for every pairing of input vector and output in the training set. The generalized back-propagation learning algorithm is the most widely employed training algorithm for a MLP. It is usually implemented using a digital computer, and is carried out by the following steps:

(1) Start with a set of random values for the weights.

(2) Present the network with a training stimulus $I_i^\alpha$ having a desired $O_i^\alpha$.

(3) Make changes to the B weights $$\Delta B_{ij} = \eta \Delta_i^B H_j \tag{17}$$

where $$\Delta_i^B = (O_i^\alpha - O_i) S'(O_i) \tag{18},$$

and where $\eta$ is a learning rate parameter. The derivative $S'(X_i)$ of the sigmoidal function is proportional to the difference $S(X_i + \delta) - S(X_i - \delta)$ obtained by adding and subtracting a constant $\delta$ from all the components of $X_i$ before implementing the sigmoidal function S. The A weights are changed according to $$\Delta A_{ij} = \eta \Delta_i^A I_j \tag{19}$$

where $$\Delta_i^A = \Sigma \Delta_j^B A_{ji} S'(H_i) \tag{20}.$$

A computer is employed to train the neural network to successfully map the input variables onto the output space and give the correct output variables. Once this training is completed, the values of the weights of the trained network provide the relative concentrations of the weight oligomers that are used in the hybridization reactions that represent the operation of the oligomer-based ANN.

Expression Profiling Via DNA Neural Networks

At different times, each cell of an organism produces a different pattern of messenger RNA's (mRNA) that is responsible for the production of various proteins and enzymes needed to express selective genetically dictated structure and actions. To detect the signature of a particular type of cell, one can isolate its mRNA, use reverse transcriptase to convert it make complementary copy DNA (cDNA), amplify the cDNA via the polymerase chain reaction, and measure the quantities of all of the different cDNA sequences that can be detected. The human genome contains some $10^5$ genes, so a thorough screening of the profile of gene expression activity in a human cell requires a measurement of the amounts of roughly $10^5$ different types of RNA simultaneously. At present, there are a number of ways of performing such "expression profiling," with the most powerful methodologies being those that make use of DNA microarrays, by which the amounts of the various cDNAs are indicated by attaching a fluorescent tag to each molecule and allowing the cDNA molecules to interact with an array containing thousands of spots, each made up of a known type of cDNA molecule attached to the surface. The unknown cDNA molecules become bound to their complements on the surface after a sufficient incubation interval, and the positions and intensities of the fluorescent spots on the array are measured to determine the pattern of gene expression, which may then become identified with a known or possibly a new type of cell activity.

With these new technologies, medical researchers can now measure and identify patterns of gene expression in cells that are characteristic of a disease or other pathological condition. As patterns of gene expression associated with diseases or other pathologies are recognized, the ability to identify and measure patterns of gene expression is becoming a powerful diagnostic tool for determining whether a patient has a disease or other pathological condition. However, the high cost of the DNA microarrays, array readers, and computers required to analyze gene expression profiles using the above-described techniques is a serious impediment to the routine clinical application of such techniques. Thus, there is a growing need for inexpensive methods for quantitatively analyzing the levels of expression in cells, and for detecting patterns of gene expression characteristic of a disease or other pathological condition.

The DNA molecules required to implement a DNA-based ANN are easily and inexpensively produced in quantity by the polymerase chain reaction. Since the operation of such an analog computer involves few enzymatic reactions, it is expected that a DNA neural network diagnostic would be available at a reasonable cost. The methods of the present invention provide a relatively low-cost, easy-to-use means for directing the powerful, pattern-recognition capabilities of a neural network to the task of analyzing gene expression in cells of medical and scientific interest. For example, a DNA-based ANN might be trained to identify cancer types and stages of malignancy, for improved diagnosis and therapy of patients who are afflicted with cancer, or are at risk of getting it.

Once a correlation between a given pattern of gene expression and a particular cellular phenotype is identified, it is a straightforward task to use an established training algorithm to identify the weights of a neural network that will reliably map the pattern of RNA levels (the inputs) to the associated cellular phenotype (the output). The same mapping can be achieved with a DNA-based neural network having weight oligomers that hybridize with cellular RNAs with rates that reflect the weights identified through training.

Because a DNA-based analog neural network can accept DNA oligomers having naturally-occurring sequences as input data, it is uniquely suited for analyzing genetic information. To perform an analysis of gene expression in a cell, the cellular mRNA is isolated and used to generate cDNA molecules. In order to assure that cDNA molecules that are relevant in the analysis of the gene expression pattern interact positively with the corresponding weight oligomers and generate release of signal oligomers, the cDNA molecules are cut with a restriction enzyme at sites that are adjacent to the portions that are complementary to the weight oligomers. This can be done by allowing the cDNAs to hybridize with single-stranded oligomers that hybridize at the sites that are to be cut, and then incubating the DNA mixture with the appropriate restriction enzymes until the sites are cleaved. The dDNAs are then combined with a set of weight oligomers of a hidden layer, in carrying out the steps required to implement the ANN and generate a set of output oligomers, as discussed above. In a preferred embodiment, the network is structured so that it has a small number of outputs that are easily read out with fluorescent indicators.

The ability of a DNA-based ANN to recognize specific patterns of gene expression allows the method to be used for a wide range of biological and medical applications.

DNA-based ANNs could be trained to determine whether a given class or type of cell is associated with a particular type or stage of cancer; they could also be used for diagnosis of other types of disease or pathological condition, and to determine whether a disease or pathological condition is hereditary. DNA-based ANNs could also be applied to determine whether a particular microorganism is a pathogen; or whether a disease or pathological condition is the result of infection by a pathogen.

Techniques similar to those used for disease diagnosis and prognosis could be used for DNA fingerprinting, in which a target sample of non-expressed DNA (nonsense DNA) collected from "evidence" is compared to that of a number of suspects. Suppose that the sample is on the order of $10^5$ base pairs in length. The sample is amplified, denatured, and fixed at a certain density in a polyacrylamide gel. A probe sample is prepared by attaching to each of the possible $10^6$ 10-mers a unit vector $E_i$ that is protected by hybridization to its complement $\underline{E}_i$. The probe sample is transported through the gel by electrophoresis, and the slow component representing the 10-mers that hybridize with the target sample is collected. The slow probe is then used as the input to a DNA Hopfield neural network in which are stored the measured probe profiles of a large set of people, including the suspects. A simple outer product of the neural network output with each of the suspect profiles gives a definitive answer to "who did it?". DNA computing could also be applied to the problem of recovering a DNA sequence from knowledge of all its subsequences of a given length.

Isolation of Cancer-Specific cDNAs for Anti-Tumor Vaccine

It is taught by P. K. Srivastava in U.S. Pat. No. 5,948,646, dated Sep. 7, 1999, entitled "Methods For Preparation Of Vaccines Against Cancer Comprising Heat Shock Proteins-Peptide Complexes," that "The complexes prepared by the methods of the invention are intracellularly produced complexes comprising hsp [heat shock proteins] from a selected recombinant host cell and antigenic peptides expressed from cDNAs of a cancer cell; the antigenic peptides of the complex are thus representative of antigenic peptides found in such cancer cell[s]."

The human genome contains some $10^5$ genes, and each of the more than 200 types of normal cells expresses certain subsets of these genes. At different times, each cell produces a different pattern of messenger RNAs (mRNA) that is responsible for the production of various proteins and enzymes needed to express selective genetically dictated structure and actions. The proteins and enzymes that have been expressed since the early development of the organism are recognized as "self" by the immune system, and thus have no antigenic properties.

The first component of the present invention increases the potency of the heat shock protein-peptide complex described in the above-cited patent by removing from the cDNA library of the cancer cell the peptides that will be recognized as self by the immune system.

To detect the signature of a representative collection of normal cells form the patient, one collects mRNA and converts it to copy DNA (cDNA). This is then amplified via the polymerase chain reaction, and the quantity of cDNA associated with each of the possible genes in the cell is measured. The pattern of expressed genes is then to be used to eliminate impotent cDNAs from the cancer cell library.

The latter operation can be carried out by making use of the DNA microarray, complemented by array readers and electronic computers. The same operations can be performed directly at the DNA level using a solution of DNA molecules configured as a neural network. The network is structured so that it directly subtracts the unwanted cDNAs by tagging them with a suitable component that binds to the matrix of a separation medium. The DNA computer molecules are easily and inexpensively produced in quantity by the polymerase chain reaction. The operation of the computer involves only a few enzymatic reactions, and the computer can easily handle the complexity of a problem involving on the order of $10^5$ dimensions. It is thus expected that a DNA neural network would allow the heat shock protein-peptide vaccine to be widely available at a reasonable cost.

EXAMPLES

Representing DNA Matrix Algebra Using Enzymatic Operations

The following enzymes may be used in carrying out manipulations providing one possible representation of DNA oligomer-based matrix algebra according to the present invention. If the buffers prove to be incompatible, the DNA products may be extracted via precipitation in ethanol after each step. Numerous different enzymes and methodologies are available for modifying and manipulating DNA, and one skilled in the art would appreciate that the present invention can be practiced using alternative combinations of enzymes and manipulations that differ from the ones described herein to achieve substantially the same results.

1) Lambda exonuclease: Amersham Pharmacia Biotech 27-0865-01. Preferentially degrades the 5' phosphorylated terminus of double-stranded DNA. Works, but with 100 times less efficiency on single-stranded DNA.

2) exonuclease I (*E. coli*): Amersham Pharmacia Biotech E70073Z. Degrades single-stranded DNA from the 3' terminus producing 5' mononucleotides.

3) exonuclease III (*E. coli*): NEBiolabs #206S. Catalyzes stepwise removal of mononucleotides from the 3' hydroxyl termini of double-stranded DNA. Not active on single-stranded DNA or protruding 3' termini.

4) RNase T1: Amersham Pharmacia Biotech E78021Y. Specifically cleaves single-stranded RNA on the 3' side of G residues.

5) bacteriophage T4 polynucleotide kinase: NEBiolabs #201S. Catalyzes transfer of terminal phosphate of ATP to 5'-hydroxyl termini of DNA.

6) terminal transferase: NEBiolabs #252S. Catalyzes addition of deoxy- or dideoxy-nucleotides to the 3' hydroxyl terminus of DNA in any double-stranded or single-stranded form.

7) DNA polymerase I, Klenow fragment, exonuclease-free: Amersham Pharmacia Biotech E70057Y. 5'-to-3' polymerase activity on primed single-stranded DNA template.

Example 1

Using Oligomers to Represent Positive and Negative Components of a Vector or Matrix A) Vector Representation Vector amplitudes $V_i$ in a space of m dimensions are represented by the concentrations $E_I$ of unique strands assigned to each of the i unit vectors $e_i$, and negative amplitudes are represented by the concentrations of strands $\underline{E}_i$. To prevent introduction of error into the operations by undesired interactions between DNA oligomers which are not fully complementary, these strands are preferably q-mers having nucleotide sequences that are selected for their inertness relative to the complete set of strands; that is, they are selected so that the DNA q-mers are non-palindromic, relatively free of hairpin effects, and have minimal overlap with the other basis vectors.

The oligomers are preferably n-mers that are synthesized with an invariant r-mer $R_1 R_2 \ldots R_r$ at their 5' ends, and/or an invariant r-mer $S_1 S_2 \ldots S_r$ at their 3' ends, with r independently being about 3-6, to assist in hybridization reactions involving oligomer termini which are employed in representing algebraic operations; e.g., in determining the inner product of vectors V and W, as described herein. Additionally, the DNA n-mers can be synthesized to have one half of a palindromic restriction enzyme recognition sequence at each end, to permit cleavage that separates pairs of strands that have been joined end-to-end, for operations such as determination of the product of a matrix and a vector, also described herein. Since each nucleotide of the core q-mer is chosen from the four bases A, G, C, T, the number of such sequences is $4^q$. If $4^q \gg m$, it is possible to select a subset of q-mers which will give a set of basis vector strands that are non-palindromic, relatively free of hairpin effects and have minimal overlap with the other basis vectors.

For example, a suitable choice for a set of n-mers having structures that are useful for the present invention is a set of single-stranded (q +2r +6)-mers of the form:

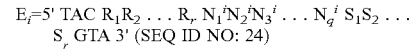

where the core q-mer sequence $N_1^i \ldots N_q^i$ is associated with the basis vector $e_i$. When such strands are joined end-to-end, the nucleotides at the junction form a palindromic restriction enzyme recognition sequence having the sequence 5' GTATAC 3', which, when hybridized to its complement to form a double-strand, is cut in the center by the restriction enzyme Bst1107 I. Negative amplitudes associated with unit vectors $e_i$ are represented by the sequence of bases complementary to $E_i$:

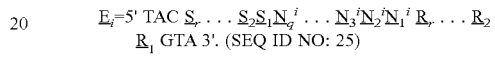

Alternatively, to assist in forming the left and right halves of the outer product matrix, e.g., in representing a Hopfield content-addressable memory, as discussed herein, the positive and negative amplitudes may be represented by strands in two forms. These forms have identical q-mers corresponding to a particular unit vector, but have one of two mutually non-complementary s-mer sticky ends, L and R, on the 3' and 5' ends, respectively. Positive amplitudes are thus represented by

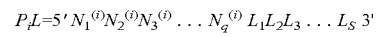

and

The negative amplitudes are likewise represented by

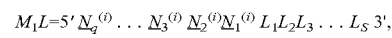

and

B) Matrix Representation

The amplitude of a matrix component $T_{ij}$ is represented by the concentration of oligomer strands consisting of pairs of unit vectors joined end-to-end. For convenience in removing the diagonal components of the matrix, positive amplitudes are represented by the concentration of strands of the form $E_i E_j$ and $\underline{E}_i \underline{E}_j$, while negative amplitudes are represented by the concentration of strands $E_i \underline{E}_j$ and $\underline{E}_i E_j$. These four types of strands are preferably formed and stored separately. A method for obtaining such dimeric oligomers is described herein, in the discussion of representing an "outer product" matrix.

C) Making the Complement of a Set of Vector Strands

1) The starting strands are 5' de-phosphorylated.

2) On the 3' ends, add invariant 3' dideoxy, 5' phosphorylated 10-mer primers λ using T4 RNA ligase.

3) The starting strands are 5' phosphorylated using bacteriophage T4 polynucleotide kinase.

4) The starting strands are copied using DNA polymerase I and 5' de-phosphorylated RNA primers λ, where the latter contain a G ribonucleotide on the 3' end.

5) The 5' phosphorylated strands are degraded to monophosphate monomers, dNMP, using Lambda exonuclease, to leave a collection of strands complementary to the set of original strands, but having the RNA primer on the 5' end.

6) The RNA is degraded using Rnase T1, which cleaves specifically on the 3' side of G residues, to leave a collection of strands complementary to the set of original strands.

D) Production of Unit Vectors

A set of basis vector strands may be found by filtering out a subset of $E_i$s with the desired properties from a collection of all possible $E_i$s.

1) Obtain a set of $E_i$s produced with random central q-mers and with invariant RNA 10-mers u and t on the 5' and 3' ends, respectively. The 5' end is de-phosphorylated. For q=30, the $2^{60}=10^{18}$ different q-mers constitute 2 μmoles of DNA strands. A 50 nmole lot of oligomers has a negligible number of complementary pairs or duplicate strands.

2) The DNA is purified by polyacrylamide gel electrophoresis (PAGE) and gel extraction at low temperature (5° C.) so that the strands having significant secondary structure are eliminated.

3) Complementary oligonucleotides are synthesized by using DNA polymerase I and extending from a 5'-phosphorylated, 3'-OH DNA primer $\underline{t}$.

4) The duplex strands are subjected to an elevated temperature for a time such that about 50% of the strands are dissociated.

5) The oligomer solution is cooled and double-stranded oligomers are collected by PAGE and gel extraction.

6) The duplex strands are subjected to an elevated temperature for a time such that 5% of the remaining strands are dissociated.

7) The oligomer solutions is cooled and the single-stranded oligomers are collected by PAGE and gel extraction. These will all have roughly the same melting temperature.

8) The 5'-phosphorylated $\underline{t}$ segments are degraded using lambda-exonuclease, and the oligomers are PAGE separated at elevated temperature so that the u$\underline{u}$ duplexes are dissociated.

The long strands are those having the u and t primers at the ends, and are retained.

9) A diluted sample containing about $10^6$ DNA strands is extracted and PCR amplified using DNA polymerase I and DNA primers $\underline{t}$ and u. The primer $\underline{t}$ that is homologous to the 5' end of the E oligomers is 5' phosphorylated, while the other one, u, is 5' de-phosphorylated.

10) The amplified set of $10^6$ different types of oligomers can hybridize in a reasonable time at a reasonable concentration. The collection is PAGE-purified after it has been allowed to hybridize for a suitable length of time, to eliminate any strand pairs that chance to hybridize significantly with each other.

11) m diluted samples of the set of E oligomers containing only a few DNA strands each are extracted, and each sample is PCR amplified using DNA polymerase I and DNA primers $\underline{t}$ and RNA primer u. The primer $\underline{t}$ that is homologous to the 5' end of the E oligomers is 5' phosphorylated, while the other one, u, is 5' de-phosphorylated.

12) A restriction enzyme is used to cleave the t/$\underline{t}$ from one end of the duplex strands.

13) The 5' phosphorylated strands are degraded to monophosphate monomers, dNMP, using Lambda exonuclease.

14) The RNA tags are degraded using RNase T1. Each sample now contains a set of a few different strands that represents one direction in vector space. For a small vector space, such as with m=1000, it is of no consequence that the strands are not all the same within each sample.

15) The complementary set of strands representing negative amplitudes may be obtained as described above.

Example 2

Vector Addition

Vectors can be added by combining solutions containing single-stranded oligomers representing the two vectors in a single container. The hybridization of complementary strands accomplishes the subtraction of amplitudes of opposite signs. The vector sum is represented by the relative concentrations of non-hybridized (single-stranded) DNA oligomers remaining after the hybridization of complementary strands. In a preferred embodiment, vectors are added by combining equal volumes of phosphorylated strands in double concentration, and separating single-stranded from double-stranded oligomers via PAGE.

Addition of two vectors can be carried out as follows:

1) Equal quantities from the two collections of DNA representing the two vectors, at twice the standard concentration, are combined under solution and temperature conditions that allow only fully complementary n-mer strands to hybridize to form stable double-stranded DNA complexes. Positive and negative contributions to the concentration of oligomers corresponding to any given basis vector hybridize to yield double-stranded DNA with blunt ends. After the reaction is complete, the positive and negative type DNA n-mers for each basis vector which remain as single-stranded oligomers represent the sum of the two vectors.

2) To quantitate the concentrations of the single-stranded oligomers that represent the vector sum, the double-stranded DNA oligomers can be separated from the single-stranded DNA n-mers of the same length; for example, by PAGE, by a high-performance liquid chromatography (HPLC) purification step, or by digesting the DNA with an appropriate enzyme such as Exonuclease III (E. coli), that cleaves double-stranded DNA but not does not cut single-stranded DNA. Following digestion of the DNA with Exonuclease III, the reaction mixture contains the single-stranded DNA oligonucleotides, plus unwanted DNA fragments that are significantly shorter than the DNA strands representing the vectors. The set of intact single-stranded DNA oligomers can then be isolated; for example, by HPLC, or by gel electrophoresis. The set of intact single-stranded DNA oligomers obtained after mixing the two DNA sets and removing the double-stranded DNA molecules as described above is an analog representation of the sum of the two vectors. The sum of any number of vectors added together can be obtained in the same manner.

Demonstration of Vector Addition

A set of DNA strands is selected to define directions in 2D vector space:

```
1P    5'    CCTCACAGATAGACCAATAGCACAGG    3'
            (SEQ ID NO: 2)

1M    5'    CCTGTGCTATTGGTCTATCTGTGAGG    3'
            (SEQ ID NO: 3)

2P    5'    CCTCGTAGCCTCCGTGCAGTTATAGG    3'
            (SEQ ID NO: 4)

2M    5'    CCTATAACTGCACGGAGGCTACGAGG    3'
            (SEQ ID NO: 5).
```

The following nominal starting concentrations represent the amplitudes of the components of the two vectors (in units of 2.1 µM):

A [1P]=1x, [2P]=0.4x
B [1M]=2x, [2P]=0.2x

Protocol (1) Combine equal volumes of A and B at twice the standard concentrations.
(2) Allow hybridization to take place.
(3) Detect single-strand concentrations by gel electrophoresis with stoichiometric excesses of fluorescent tags complementary to the four basis strands.

Figure 9:
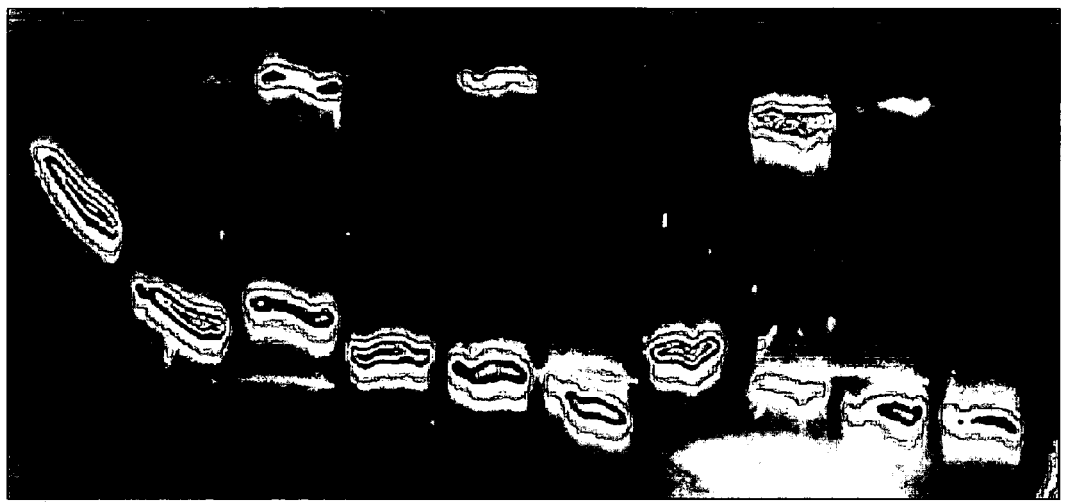
FIG. 9 shows electrophoretic separation of DNA oligomers to determine amplitudes for vector addition. See Example 2.
Figure 9:

From the electrophoresis gel shown in FIG. 9, we determine the following measured intensities for the vectors A and B:

A [1P]=0.91x, [2P]=0.28x
B [1M]=1.98x, [2P]=0.11x

The theoretical sum intensities:
A+B [1M]=1.07x, [2P]=0.39x are to be compared to the measured sum intensities:
A+B [1M]=1.01x, [2P]=0.46x.

Figure 10:
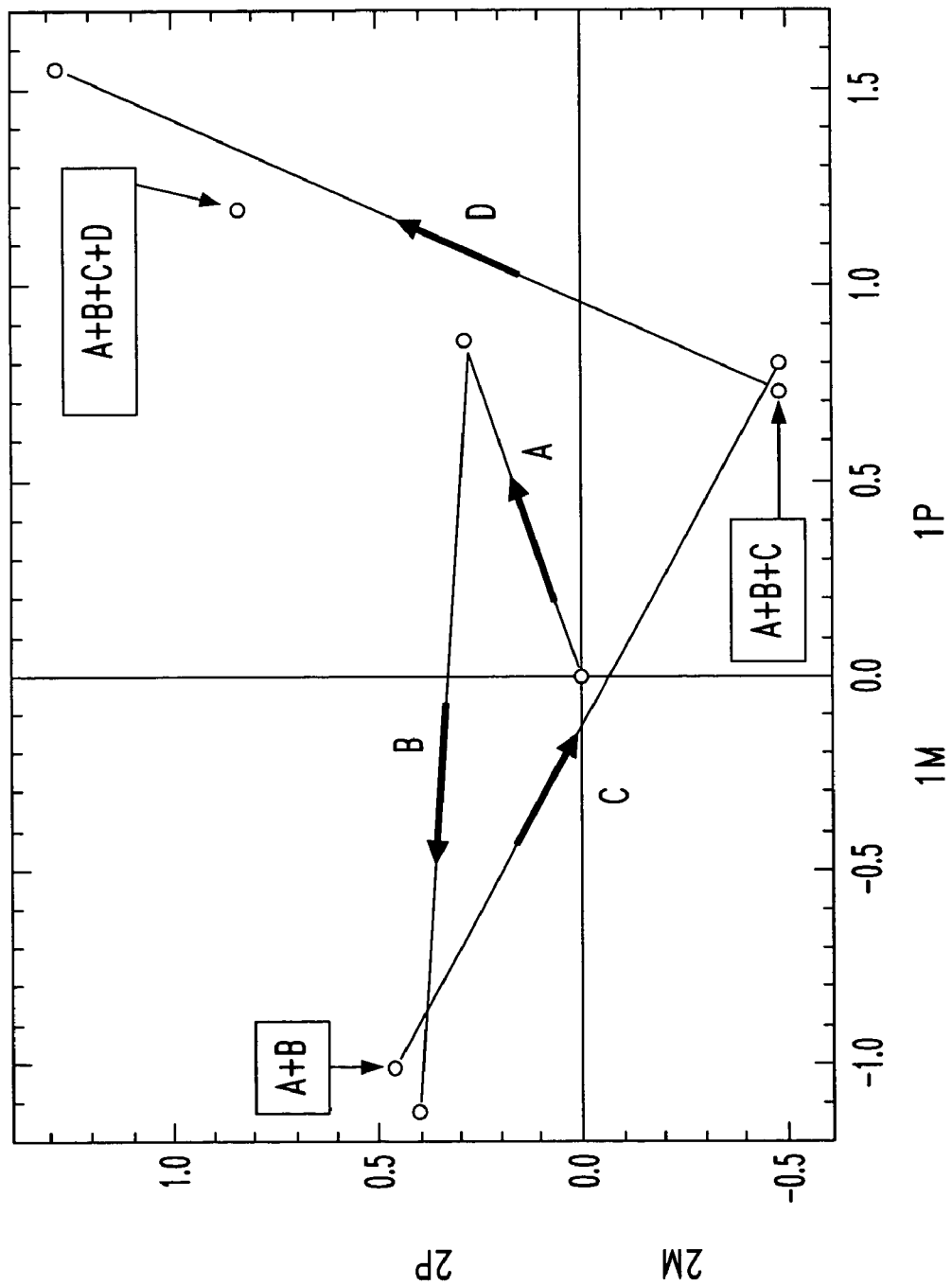
FIG. 10 shows the result of adding a series of 2D vectors together. See Example 2.

FIG. 10 depicts a graph that shows the result of adding a series of 2D vectors together.

Example 3

Inner Product of Two Vectors

The inner product of two vectors $\Sigma_i V_i W_i$ can be found by (i) allowing the collections of strands $V_i$ and $W_i$ representing vectors V and W, respectively, to hybridize in one container, and (ii) in a second container, allowing the strands representing the first vector ($V_i$) to hybridize with the complement of the strands representing the second vector ($W_i$). If the hybridization reactions in the two containers are halted while they are proceeding at a rate that is approximately proportional to the initial concentrations of the single-stranded oligomers in the reaction mixtures, the inner product is proportional to the difference between the total double-stranded DNA concentrations in the two containers.

For example, the inner product of two vectors $\Sigma_i V_i W_i$ can be found as follows:

Method A

1) Three separate samples of each of the two collections of DNA n-mers representing the individual vectors $V_i$ and $W_i$ are obtained.

2) A first pair of samples of the $V_i$ and $W_i$ vectors is combined and the rate of hybridization, $R_-$, is measured. The value of $R_-$ is proportional to the time rate of increase of V-W duplex strands representing quantities of opposite sign. The individual contributions to $R^-$ are proportional to the product of the concentrations of the two V and W strands, and hence are proportional to the inner product. The concentration of double-stranded DNA is measured, e.g., by treating the DNA mixture with a fluorescent dye such as ethidium bromide that intercalates the double helix. The DNA-ethidium bromide complex fluoresces at 590 nm when excited by 300-nm light, and thus provides a quantifiable signature for the concentration of double stranded DNA. Alternatively, double-stranded DNA oligomers can be separated from unhybridized, single-stranded DNA by degrading the single-stranded DNA in the containers with exonuclease I (E. coli), and passing the digestion products through a size-exclusion chromatography column, prior to measuring the concentration of double-stranded oligomers.

3) A V sample and a W sample are each treated to modify the 3' ends of the strands so that additional nucleotides cannot be attached in a polymerase-catalyzed extension reaction. For example, dideoxynucleotides can be added to the 3' termini of the V and W strands in a reaction catalyzed by a terminal transferase. Alternatively, a short oligomer having a non-extendable nucleotide (e.g., a dideoxynucleotide) at its 3' end can be ligated to the 3' ends of the V and W strands, using bridging linker oligomers, followed by separation of the modified V and W strands from the shorter oligomers.

4) The modified V and W strands are each incubated separately with DNA polymerase in a suitable buffer and the two primers,

```
5' AATGCAAGATCGAAATTTATACGTTTATCT TAC S_r . . . S_2 S_1 3'   (A), and
(SEQ ID NO: 6)

Figure 11:
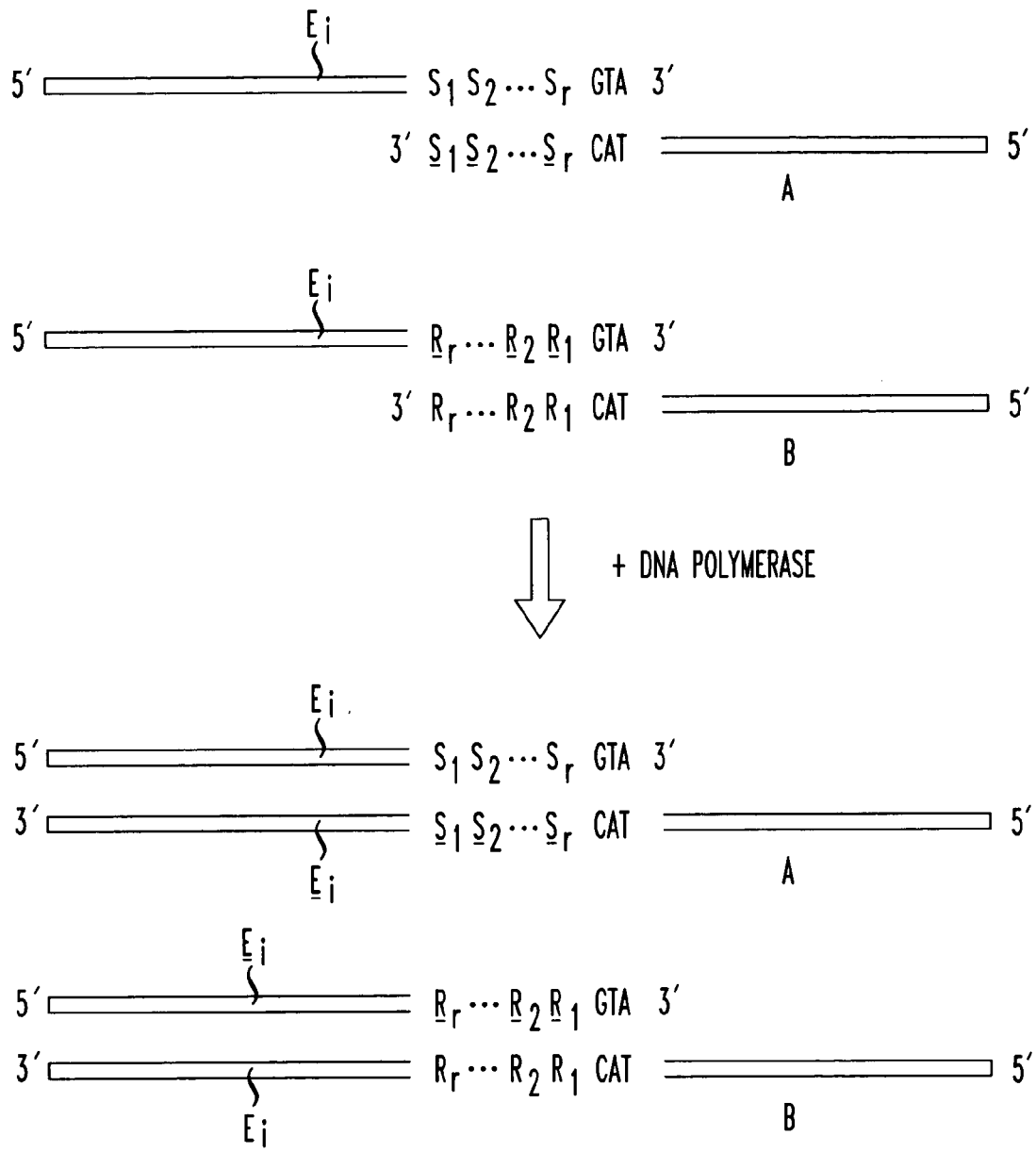
FIG. 11 schematically represents a process that determines the inner product of V and W. In the process, the 3' portions of primers A and B are hybridized to the 3' portions of DNA strands of vector V or W, and the primer strands are extended to produce DNA strands $\underline{V}$ or $\underline{W}$ that are complementary to the V or W template strands.

5' AATGCAAGATCGAAATTTATACGTTTATCT TAC R_1 R_2 . . . R_r 3'   (B)
(SEQ ID NO: 7)
``` where 5' AATGCAAGATCGAAATTTATACGTTTATCT 3' (SEQ ID NO: 8) exemplifies a long, inert strand that does not hybridize with any of the $V_i$ or $W_i$ strands and form a stable double-stranded complex under the conditions used in the subsequent reaction steps. Of course, primer strands having other nucleotide sequences that do not hybridize with any of the $V_i$ or $W_i$ strands can be used instead of those shown above as (A) and (B), with equal success. The 3' ends of the long primer strands are extended on the V and W templates, producing the complements $\underline{V}$ and $\underline{W}$ to all the V and W strands present (FIG. 11).

5) The $\underline{V}$ and $\underline{W}$ complementary DNA oligomers produced by extension of the long primers (A) and (B) are separated from the shorter V and W template strands by HPLC to yield the $\underline{V}$ and $\underline{W}$ strands.

6) The third pair of samples of V and W DNA strands is used in combination with the $\underline{V}$ and $\underline{W}$ strands obtained in the previous step to measure the rate of hybridization $R_+$. V strands are mixed with $\underline{W}$, and $\underline{V}$ with W, and the rate of hybridization $R_+$ is measured for each reaction. The value $R_+$ should be the same for each reaction; when the two rates may differ, e.g., due to effects of sequence-dependent oligomer structure on the average melting temperature of each strand mixture, the average of the two rates can be obtained and used as $R_+$.

7) The inner product of the two vectors is represented by the suitably normalized difference of the rates, $R_+ - R_-$, where each rate $R_+$ and $R_-$ is suitably normalized to correct for concentration differences.

Example 4

Outer Product of Two Vectors

The outer product matrix $V_i W_j$ is formed by joining the 3' ends of the single-stranded DNA oligomers corresponding to $V_i$ to the 5' termini of the DNA oligomers corresponding to $W_j$.

Two methods by which an outer product matrix can be obtained are described below:

Method A

To make outer product matrix $T_{ij} = V_i W_j$, given vectors $V_i$ and $W_i$, matrix strands are prepared in four separate vials containing the four possible combinations of the two signals of the vector amplitudes. The L form of oligomer is used for the $V_i$ oligomers and the R form for the $W_i$ oligomers (see Example 1 (A) above). The following steps are carried out for each vial:

1) The RW strands are phosphorylated on the 5' ends using bacteriophage T4 polynucleotide kinase and are 3' dideoxy modified.

2) The VL strands are the complementary set to the desired vector and are 5'-dephosphorylated, 3'-OH.

3) The VL strands are hybridized with a stoichiometric quantity of primers

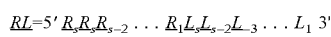

and are joined to random RW strands using T4 DNA ligase.

4) Self-hybridized strands, but not chains of hybridized strands, are removed by PAGE separation, thus eliminating the diagonal component of the outer product.

5) The strands are extended using the exonucluecase-free Klenow fragment of DNA polymerase I. The VL parts of the matrix strands are thus now inert to hybridization with any vector strands.

Method B

1) To ensure that the $V_i$ and $W_j$ strands are attached to each other in the proper orientation, the 5' phosphate residues are removed from the $V_i$ oligomers, e.g., using bacterial alkaline phosphatase, and the 5' termini of the $W_j$ are phosphorylated, e.g., using bacteriophage T4 polynucleotide kinase.

2) The $W_j$ strands are further modified by ligating to their 3' termini a long, inert strand {F} that does not hybridize with any of the $V_i$ or $W_j$ strands and form a stable double-stranded complex under the conditions used in the subsequent reaction steps. The modified $W_j$ strands and the {F} strands are ligated using bridging linker oligomers having the structure:

and

where h is about 6-9, such that the h nucleotides at the 5' ends of the bridging linker strands are complementary to the first h nucleotides at the 5' ends of the {F} strands. The bridging linkers thus hybridize to the 3' terminal portions of the modified $W_j$ strands and the 5' terminal portions of the F strands and align them end-to-end for efficient ligation to obtain strands of the form $\{E_j\}$ {F} and $\{\underline{E}_j\}$ {F}, which are purified from the shorter bridging linker oligomers.

3) The modified $V_i$ and $W_j\{F\}$ strands are then ligated together using the four types of bridging linker strands:

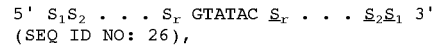

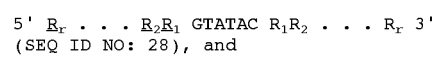

Figure 12:
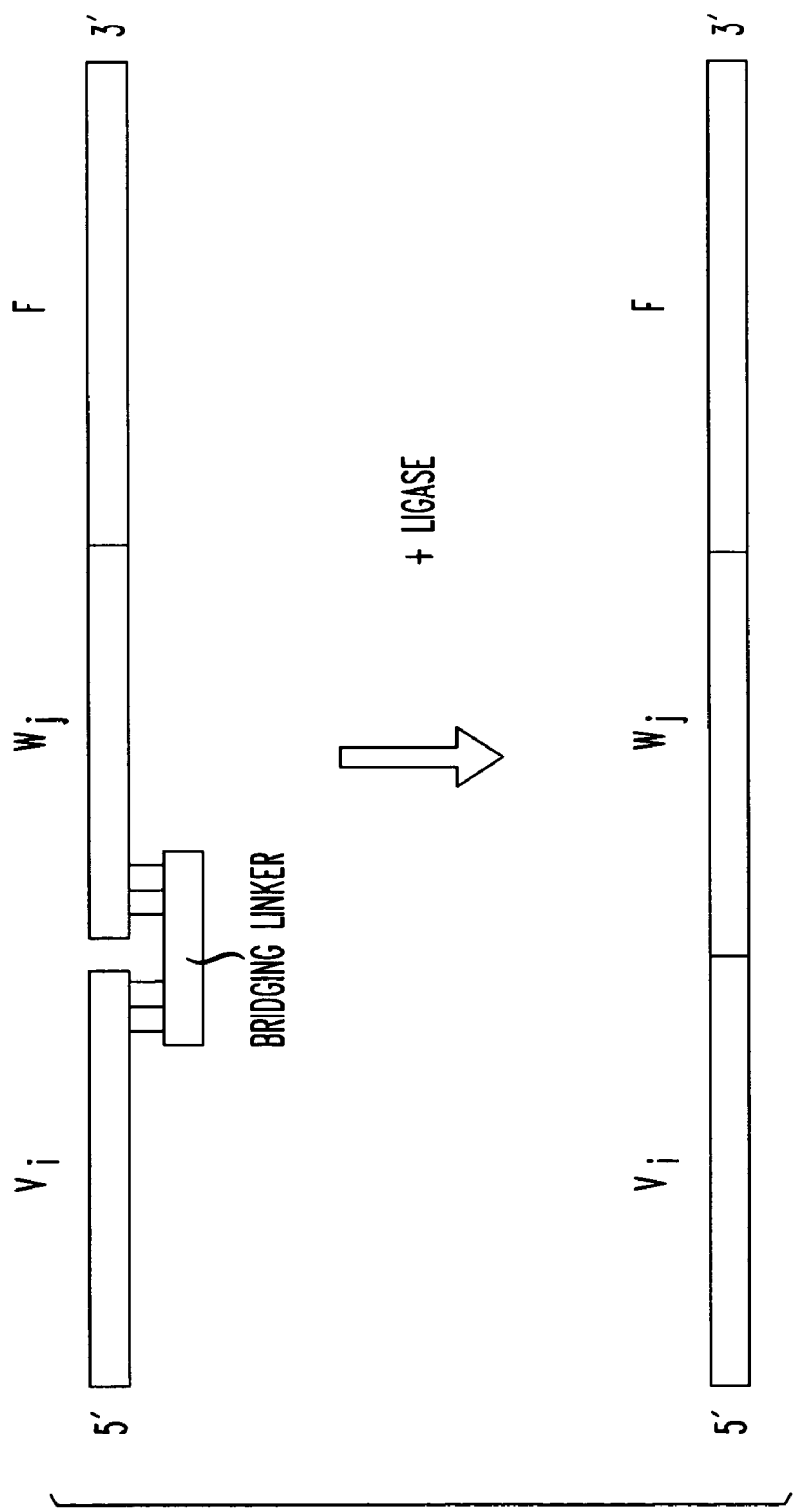
FIG. 12 schematically represents a process that determines the outer product of V and W. In the process, a bridging linker oligomer aligns the 3' end of a $V_i$ strand and 5' end of a $W_j\{F\}$ strand for efficient ligation to obtain a strand of the form $\{E_i\}$ $\{E_j\}$ $\{F\}$.

which hybridize to the 3' terminal portions of the $V_i$ strands and the 5' terminal portions of the $W_j$ strands and align them end-to-end for efficient ligation to obtain strands of the form $\{E_i\} \{E_j\} \{F\}, \{\underline{E}_i\} \{E_j\} \{F\}, \{E_i\} \{\underline{E}_j\} \{F\}$, and $\{\underline{E}_i\} \{\underline{E}_j\} \{F\}$(FIG. 12). The number of ij strands is proportional to the product of the concentrations of the $V_i$ and $W_j$ strands and hence to the desired outer product. This is approximately true even if the reaction is allowed to run to completion, since there are so many different reactions competing for the same strands. DNA strands of the form $E_i E_i$ will spontaneously form hairpins and may be removed by a first purification stage using gel electrophoresis or chromatography at room temperature. The remaining diagonal components of $T_{ij}$, of the form $E_i E_i$ and $\underline{E}_i \underline{E}_i$ (e.g. $T_{11}, T_{22}, T_{33} \ldots$) may be removed if desired by allowing the strands representing $T_{ij}$, to hybridize with an equal total concentration of strands representing a unit matrix $\delta_{ij}$ having only diagonal components. The desired $T_{ij}$ strands lacking any diagonal components may then be extracted by a second purification stage performed under temperature and solution conditions selected such that single duplex pairs of E's melt, but double length hybridized segments corresponding to $T_{ii} \delta_{ii}$ remain in double-stranded form.

Example 5

Product of a Matrix and a Vector

Two methods by which the matrix inner product $\Sigma_j T_{ij} X_j$ can be obtained are described below:

Method A

1) The four separate types of matrix strands are allowed to hybridize with 3'-OH vector strands while eating single-stranded DNA with Exonuclease I (*E. coli*). Since the reaction cannot be stopped by heating without denaturing the duplex DNA, the hybridized strands must be purified by PAGE.

2) The vector strands are extended along the matrix strands using the exonuclease-free Klenow fragment of DNA polymerase I, displacing the strands protecting the VL portions of the matrix strands.

3) The displaced protection strands terminating ina 5' LR strand are separated from each vial via PAGE, added together, and represent the negative of the desired product to within a multiplicative constant.

Method B

An embodiment of the method allowing one to find the matrix inner product $\Sigma_j T_{ij} X_j$, given a matrix T represented by strands of the form $\{E_i\} \{E_j\} \{F\}$, $\{E_i\} \{\underline{E}_j\} \{F\}$, $\{\underline{E}_i\} \{E_j\} \{F\}$, and $\{\underline{E}_i\} \{\underline{E}_j\} \{F\}$, and a vector X represented by strands of the form $\{E_i\}$ and $\{\underline{E}_i\}$ having concentrations proportional to the amplitudes $X_j$, is described below. The strands $\{E_i\}$ and $\{\underline{E}_i\}$ of vector X are referred to as $\{X_j\}$ to distinguish them from the strands of the matrix T.

(1) An oligomer sample is obtained that is the complement to $\{X_j\}$ which is referred to as $\{\underline{X}_j\}$.

(2) To the 5' ends of both the $\{X_j\}$ strands and their complements, are ligated DNA strands $\{G\}$ which are about twice as long as the $\{F\}$ oligomers ligated to the 3' termini of the matrix strands, and which are complementary in their 3' halves to the $\{F\}$ oligomers. The $\{G\}$ strands and the $\{X_j\}$ strands are ligated using bridging linker oligomers having the structure:

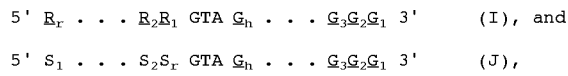

where h is about 6-9, with the h nucleotides at the 3' ends of the bridging linker strands being complementary to the last h nucleotides at the 3' ends of the $\{G\}$ strands. The bridging linkers (I) and (J) hybridize to the 3' terminal portions of the $\{G\}$ strands and the 5' terminal portions of the $\{X_j\}$ or $\{\underline{X}_j\}$ strands and align them end-to-end for efficient ligation to obtain strands of the form $\{G\} \{X_j\}$ and $\{G\} \{\underline{X}_j\}$, respectively, which are purified from the shorter bridging linker oligomers.

(3) One of the resulting two strand collections, $\{G\} \{\underline{X}_j\}$ is incubated with a sample of the matrix strands and an enzyme with ligase activity, plus the set of (r+3)-mers:

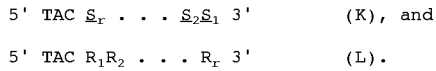

Figure 13:
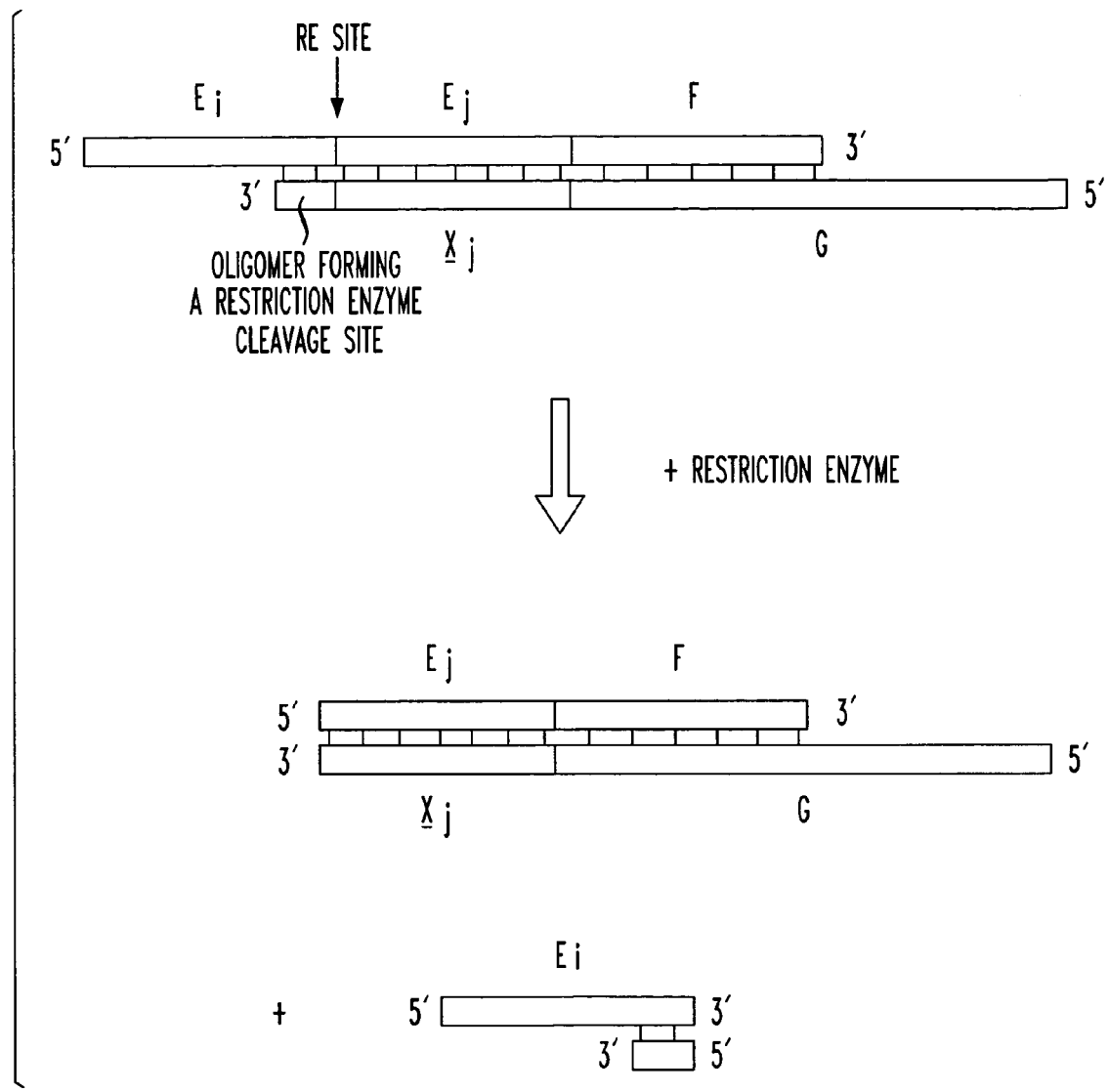
FIG. 13 schematically represents a process that determines the product of vector X and matrix $T_{ij}$. The outer product of $V_iV_j$, in which DNA strands containing $\{X_j\}$ are used to select $\{V_i\}$ strands of the form $\{E_i\}$ and $\{\underline{E}_i\}$, represents an unchanged sign contribution to the product.

Ligation of the (r+3)-mers to the 3' ends of the $\{G\} \{\underline{X}_j\}$ strands that are hybridized to matrix strands results in formation of double-stranded recognition sites for the restriction enzyme Bst1107 I. The ligase is then inactivated, and the newly formed double-stranded restriction enzyme recognition sites are cut using Bst1107 I enzyme, resulting in release of a set of $\{V_i\}$ strands from the matrix strands (FIG. 13). Purification of the short $\{V_i\}$ segments yields a collection of $\{V_i\}$ strands of the form $\{E_i\}$ and $\{\underline{E}_i\}$ representing an unchanged sign contribution to the product.

(4) A second sample of the matrix is treated to modify the 3' ends of the strands so that additional nucleotides cannot be attached in a polymerase-catalyzed extension reaction. For example, dideoxynucleotides can be added to the 3' termini of the V and W matrix strands in a reaction catalyzed by a terminal transferase, as discussed above in the description of determination of an inner product. The modified matrix strands are then incubated with the other of the two strand collections, $\{G\} \{X_j\}$, and a DNA polymerase capable of primer extension, e.g., T4 DNA polymerase, in a buffer solution suitable for polymerase-catalyzed primer extension. Incubation results in the extension of the $\{X_j\}$ strands at their 3' ends, using the $\{E_i\}$ and $\{\underline{E}_i\}$ strands at the 5' ends of the matrix DNAs as templates, to produce strands of the form $\{G\} \{X_j\} \{\underline{V}_i\}$. The strands are melted and the longer $\{G\} \{X_j\} \{\underline{V}_i\}$ segments are separated. These strands are then hybridized with the set of four linker strands (E), (F), (G), and (H) described above, and the resulting double-stranded restriction enzyme recognition sites are cut using Bst1107 I enzyme, resulting in release of a set of $\{\underline{V}_i\}$ strands. The strands are separated, e.g., on the basis of their size, to yield a collection of $\{\underline{V}_i\}$ strands of the form $\{E_i\}$ and $\{\underline{E}_i\}$ representing a changed sign contribution to the product (FIG. 14).

(5) The $\{\underline{V}_i\}$ strands from step (IV) above are added to the $\{V_i\}$ strands obtained in step (III) above, using the previously described vector addition routine, to give a set of single-stranded DNA oligomers that is an analog representation of the desired product.

Oligomers Employed to Demonstrate Obtaining an Analog Representation of a Matrix Inner Product A method for obtaining an analog representation of the product of a matrix times a vector $W_i = \Sigma_j T_{ij} V_j$, where the matrix has no diagonal components, as is the case for the Hopfield algorithm, can be experimentally demonstrated using the oligomers described below:

The DNA oligomers employed are the four vector basis strands described in Example 2 above, the following eight off-diagonal matrix strands, in which the basis sequences are separated by a common 10-nucleotide sequence,

```
1P2P  5'CACAGATAGACCAATAGCAC CACACTGTCA CGTAGCCTCCGTGCAGTTAT 3'
      (SEQ ID NO: 9),

2P1P  5'CGTAGCCTCCGTGCAGTTAT CACACTGTCA CACAGATAGACCAATAGCAC 3'
      (SEQ ID NO: 10),

1P2M  5'CACAGATAGACCAATAGCAC CACACTGTCA ATAACTGCACGGAGGCTACG 3'
      (SEQ ID NO: 11),

2P1M  5'CGTAGCCTCCGTGCAGTTAT CACACTCTCA GTGCTATTGGTCTATCTGTG 3'
      (SEQ ID NO: 12),

1M2P  5'GTGCTATTGGTCTATCTGTG CACACTGTCA CGTAGCCTCCGTGCAGTTAT 3'
      (SEQ ID NO: 13),

2M1P  5'ATAACTGCACGGAGGCTACG CACACTGTCA CACAGATAGACCAATAGCAC 3'
      (SEQ ID NO: 14),
```

-continued

```
1M2M 5'GTGCTATTGGTCTATCTGTG CACACTGTCA ATAACTGCACGGAGGCTACG 3'
     (SEQ ID NO: 15),

2M1M 5'ATAACTGCACGGAGGCTACG CACACTGTCA GTGCTATTGGTCTATCTGTG 3'
     (SEQ ID NO: 16),
``` and the following primer strands, with the lower-case letter representing an RNA base,

```
MU  5' CACACTGTCA 3' (SEQ ID NO: 17)

and

MUC 5' TGACAGTGTg 3' (SEQ ID NO: 18).
```

The eight diagonal matrix strands [1P1P, 2P2P, 1P1M, 2P2M, 1M1P, 2M2P, 1M1M, and 2M2M] are not used.

Fluorescent tag oligomers for identifying gel electrophoresis bands are the same as the vector strands, but they have AACCT- added to the 5' ends, and -AGGAA to the 3' end, together with 5' TET and 3'TAMRA dyes. The tag labels signify to which vector they are complimentary:

```
T1M  TET 5' AACCTCACAGATAGACCAATAGCACAGGAA 3' TAMRA
         (SEQ ID NO: 19),

T1P  TET 5' AACCTGTGCTATTGGTCTATCTGTGAGGAA 3' TAMRA
         (SEQ ID NO: 20),

T2M  TET 5' AACCTCGTAGCCTCCGTGCAGTTATAGGAA 3' TAMRA
         (SEQ ID NO: 21),

T2P  TET 5' AACCTATAACTGCACGCAGGCTACGAGGAA 3' TAMRA.
         (SEQ ID NO: 22).
```

In addition, a fluorescent tracer DNA oligomer is used for alcohol precipitation: TRACER (A01_DSC) TET 5'CTA-CATTCGTGGTTGAGCACTAGCAGGCA 3' TAMRA (SEQ ID NO: 23).

Successful operation of a scheme for matrix multiplication employing the above oligomers has been verified experimentally.

Example 6

Sum of Many Matrices

The sum of many matrices $\Sigma_{ij} = \Sigma_a T_{ij}^a$ can be obtained by adding the four components of the different sets of matrix strands separately into four containers. The sum of matrices contains many positive and negative off-diagonal components that will not cancel because they are in separate containers. When the product of a matrix times a vector is taken, the opposing result vector amplitudes will cancel, precisely as was assumed in our analysis of the physical constraints on the performance of a DNA representation of the Hopfield algorithm.

Example 7

Matrix Multiplication

1) The matrix strands are 5' phosphorylated using T4 polynucleotide kinase.

2) The four types of matrix strands are mixed in the appropriate ratios in four vials A-D. For a matrix that rotates a 2D vector by 90°, we need equal amounts of T21PP in Vial A, T12PM in Vial B, T21MP in Vial C, and T12MM in Vial D. Prepare strands representing a 2D vector to be rotated, say one unit of E1 plus 0.5 units of E2.

3) At a high dilution in the separate vials, so the hybridization will proceed at a slow rate, the matrix strands are allowed to hybridize with vector strands in the presence of DNA polymerase I Klenow fragment, exonuclease-free, and the polymerase reaction buffer for a time that is short compared to the inverse of the hybridization time constant. The appropriate conditions are 100 nM average concentration of each basis vector, leading to a ~100 sec. hybridization time constant in 0.1 M Na. The Klenow reaction buffer is 0.1 M Mg instead, but perhaps the hybridization rate will be about the same as in 0.1 M Na. We want the polymerase rate to be fast compared to the hybridization rate, so use 10× as much polymerase as usual.

a) For each vial, prepare the following mixture at 37° C. (total volume 100 μl):

| | |
|---|---|
| NEBuffer 4, 10× | 10 μl |
| CoCl$_2$, 2.5 mM | 10 μl |
| ddNTP, 5 mM | 1 μl (5 nm) |
| each DNA strand | 100 pm |
| Klenow | 10 μl (100 units) |
| water | 68 μl | b) After six representative time intervals (10 s, 30 s, 1 m, 3 m, 10 m, 60 m), remove 10 μl samples of the reaction mixture and stop the polymerase reaction by adding 1 μl 10× TE buffer. The samples, labeled A1-A6, etc., contain vector strands attached to MUC strands, the concentrations of which represent the negative of the matrix-vector product.

c) Combine the contents of the six A, B, C, and D vials to obtain six vials ABCD1-ABCD6. The combining of the vials effects the cancellation of opposite sign contributions represented by the hybridization of any complementary free tags.

d) Divide the six vials ABCD1-ABCD6 into five vials each, labeled ABCD1-0, ABCD1-1P, ABCD1-1M, ABCD1-2P, ABCD1-2M, etc. Into the P vials, add 20 pm of the fluorescent tag T1P, and so forth for the other vials.

e) Read the results via electrophoresis gel.

4) The vector strand outputs may be made suitable for use in subsequent operations as follows:

a) Separate the vector strands that have the MUC primer attached to them.

b) Cleave off the primer using RNase T1, which cleaves specifically on the 3' side of g residues.

Example 8

An Oligomer-based Content-addressable Memory

As an illustrative example, the present invention is described in its implementation as a DNA-based representation of a Hopfield neural network which operates as an associative, content-addressable memory.

Each item of experience, defined as vector $V=\Sigma V_i e_i$ in the neural network, is represented by a set of single-stranded DNA (q +2r +6)-mers of the form $E_i$:

$E_i$ = 5' TAC $R_1 R_2$ . . . $R_r$ $N_1^1 N_2^1 N_3^1$ . . . $N_q^1$ $S_1 S_2$ . . . $S_r$ GTA 3'
(SEQ ID NO: 24)

and E1:

$\underline{E}_1$ = 5' TAC $\underline{S}_r$ . . . $\underline{S}_2 \underline{S}_1 \underline{N}_q^1$ . . . $\underline{N}_3^1 \underline{N}_2^1 \underline{N}_1^1$ $\underline{R}_r$ . . . $\underline{R}_2 \underline{R}_1$ GTA 3',
(SEQ ID NO: 25)

representing positive and negative vector components, respectively, with the complementary core q-mer sequences $N_1^i \ldots N_q^i$ of $E_i$ and $\underline{N}_1^i \ldots \underline{N}_q^i$ of $\underline{E}_i$ being associated with the basis vector $e_i$, and concentrations $[E_i]$ and $[\underline{E}_i]$ being proportional to the amplitudes $V_i$. When such strands are joined end-to-end, the nucleotides at the junction form a palindromic restriction enzyme recognition sequence having the sequence 5' GTATAC 3', which, when hybridized to its complement to form a double-strand, is cut in the center by the restriction enzyme Bst1107 I.

The content-addressable memory matrix $T_{ij}$ defined in Equation (3) is analogous to the outer product matrix $\Sigma_a V_i^a V_j^a$, the sum of all of the outer products $V_i^a V_j^a$ of all the experience vectors $V_i^a$ for i≠j.

Given a vector $U_i^a$ that imperfectly represents the particular experience $V_i^b$, the substantially or essentially complete experience vector $V_i^b$ is recalled from the content addressable memory matrix $T_{ij}$, as depicted in Equation 4, by finding a set of DNA strands $X_i$ corresponding to the inner product of the $T_{ij}$ matrix and the vector $U_i^b$, and then implementing the saturating function $S(X_i)$, by which a selected set of DNA strands representing the vector $X_i$ is captured by hybridizing to a complete, sub-stoichiometric set of single-stranded $E_i$ and $\underline{E}_i$ strands that are tethered to a solid substrate to form a hybridization array on a DNA chip. Excess (unhybridized) single-stranded $X_i$ strands are then washed away from the double-stranded complexes formed by hybridizing the $X_i$ strands to the set of saturating $E_i$ and $\underline{E}_i$ strands, and a set of oligomer strands representing the saturated $X_i$ strands, $S(X_i)$, is obtained by heat-denaturing the substrate-bound, double-stranded molecules containing the $S(X_i)$ strands, and collecting the selected set of single-stranded $X_i$ oligomers released by the denaturing treatment.

In a preferred embodiment of the method, memory matrix $T_{ij}$ is produced by the following steps:

(a) For each $V^a$, two sets of oligomers are obtained:

(1) a first set of oligomers $E_i$ and $\underline{E}_i$ for i=1 to i=m as described above, that represents the data elements to be stored in memory.

(2) a second set of oligomers $E_i$ and $\underline{E}_i$ for i=1 to i=m, as described above, representing data elements to be stored in memory, and comprising at their 3' ends a third oligomer sequence F that is not complementary to any sequence $E_i$ or $\underline{E}_i$ for i=1 to i=m. The nucleotide sequence of F is chosen so that it does not form hairpin or other hybridization-inhibiting secondary structures, and so that it forms a double-strand with its complement that preferably has a melting temperature that is the average melting temperature of the set of $E_i$ and $\underline{E}_i$ sequences.

(b) The first and second sets of oligomers are combined in the presence of ligase so that the 3' ends of said first set of oligomers are ligated to the 5' ends of said second set of oligomers.

(c) Dimeric oligomers comprising, in the same oligomer, first and second oligomer sequences that are the same as, or are complementary to, each other are removed from each set of ligated oligomers. The sets of dimeric, outer product DNA strands of the form $\{E_i\}$ $\{E_j\}$ $\{F\}$, $\{\underline{E}_i\}$ $\{E_j\}$ $\{F\}$, $\{E_i\}$ $\{\underline{E}_j\}$ $\{F\}$, and $\{\underline{E}_i\}$ $\{\underline{E}_j\}$ $\{F\}$, where i≠j, for each experience vector $V^a$ are pooled to yield a set of oligomers representing the content-addressable memory matrix $T_{ij}$ (see method B of Example 4, and FIG. 3).

A preferred method for obtaining a set of oligomer strands $X_i$, analogous to finding a matrix inner product $\Sigma_j T_{ij} U_i^b$, is described below.

(a) A set of oligomers $U_i$ is obtained which represents data vector $U_i^b$ and comprises oligomer sequences of the form $E_i$ and $\underline{E}_i$ having concentrations proportional to the corresponding amplitudes in $U_i^b$.

(b) A set of oligomers $\underline{U}_i$ is obtained which comprises oligomer sequences complementary to the oligomer sequences $E_i$ and $\underline{E}_i$ present in $U_i$, the concentrations of which are proportional to the corresponding amplitudes of their complements in $U_i^b$.

(c) The 5' ends of said oligomers $U_i$ and $\underline{U}_i$ are ligated to an oligomer strand G that comprises at its 3' end an oligomer sequence complementary to the oligomer sequence F that is present in the memory pool oligomers.

(d) The oligomers comprising $G+\underline{U}_i$ sequences are mixed with a sample of said dimeric memory oligomers so that oligomers comprising $\underline{U}_i$ sequences complementary to $E_j$ or $\underline{E}_j$ sequences in the memory oligomers hybridize thereto and form double-stranded oligomeric structures that each comprise a cleavage site for the restriction enzyme Bst1107 I between the $E_j$ or $\underline{E}_j$ sequence and the linked, single-stranded oligomer comprising an $E_i$ or $\underline{E}_i$ sequence. The Bst1107 I restriction sites in the centers of the dimeric memory oligomers that were made double-stranded by hybridization of the $\underline{U}_i$ oligomer sequences to complementary $E_j$ or $\underline{E}_j$ sequences in the memory oligomers are then cleaved with Bst1107 I enzyme, and the single-stranded oligomers comprising $E_i$ and $\underline{E}_i$ sequences released by the cleavage reaction are collected to obtain a set of oligomers $\{X_i\}$ representing the unchanged sign contribution to the inner product.

(e) The oligomers comprising $G+U_i$ sequences are mixed with a sample of the dimeric memory pool oligomers having 3' ends that are modified to inhibit polymerase-catalyzed addition of nucleotides at said 3' ends, so that oligomers comprising $U_i$ sequences complementary to $E_j$ or $\underline{E}_j$ sequences in the memory oligomers hybridize thereto and form double-stranded structures. The 3' ends of the hybridized $U_i$ oligomer sequences are then extended by polymerase, using the single-stranded $E_i$ and $\underline{E}_i$ sequences extending from the double-stranded structures as template strands, thereby generating oligomer sequences complementary to the $E_i$ and $\underline{E}_i$ sequences attached to the 3' ends of said Ui oligomer sequences. The resulting double-stranded oligomeric structures are then denatured, and the G+U$_i$ oligomers comprising the newly synthesized oligomer sequences complementary to $E_i$ and $\underline{E}_i$ sequences in the memory oligomers are isolated. The isolated G+U$_i$ oligomers comprising the newly synthesized oligomer sequences complementary to $E_i$ and $\underline{E}_i$ are cleaved to separate said newly synthesized oligomer sequences complementary to $E_i$ and $\underline{E}_i$ from the G+U$_i$ sequences. This is done by allowing short, single-stranded stranded oligomers complementary to a sequence adjacent to the U$_i$ sequence comprising the Bst1107 I restriction site to hybridize to the oligomers, and then cutting with Bst1107 I. The oligomers comprising sequences complementary to $E_i$ and $\underline{E}_i$ in said memory oligomers are collected to obtain a set of oligomers $\{\underline{X}_i\}$ representing the changed sign contribution to the inner product.

(f) In an operation analogous to vector addition, an amount of the set of oligomers $\{X_i\}$ from step (d) above is combined with an equal amount of the set of oligomers $\{\underline{X}_i\}$ from step (e) above, to yield a set of oligomer strands X$_i$ corresponding to the matrix inner product.

Figure 4:
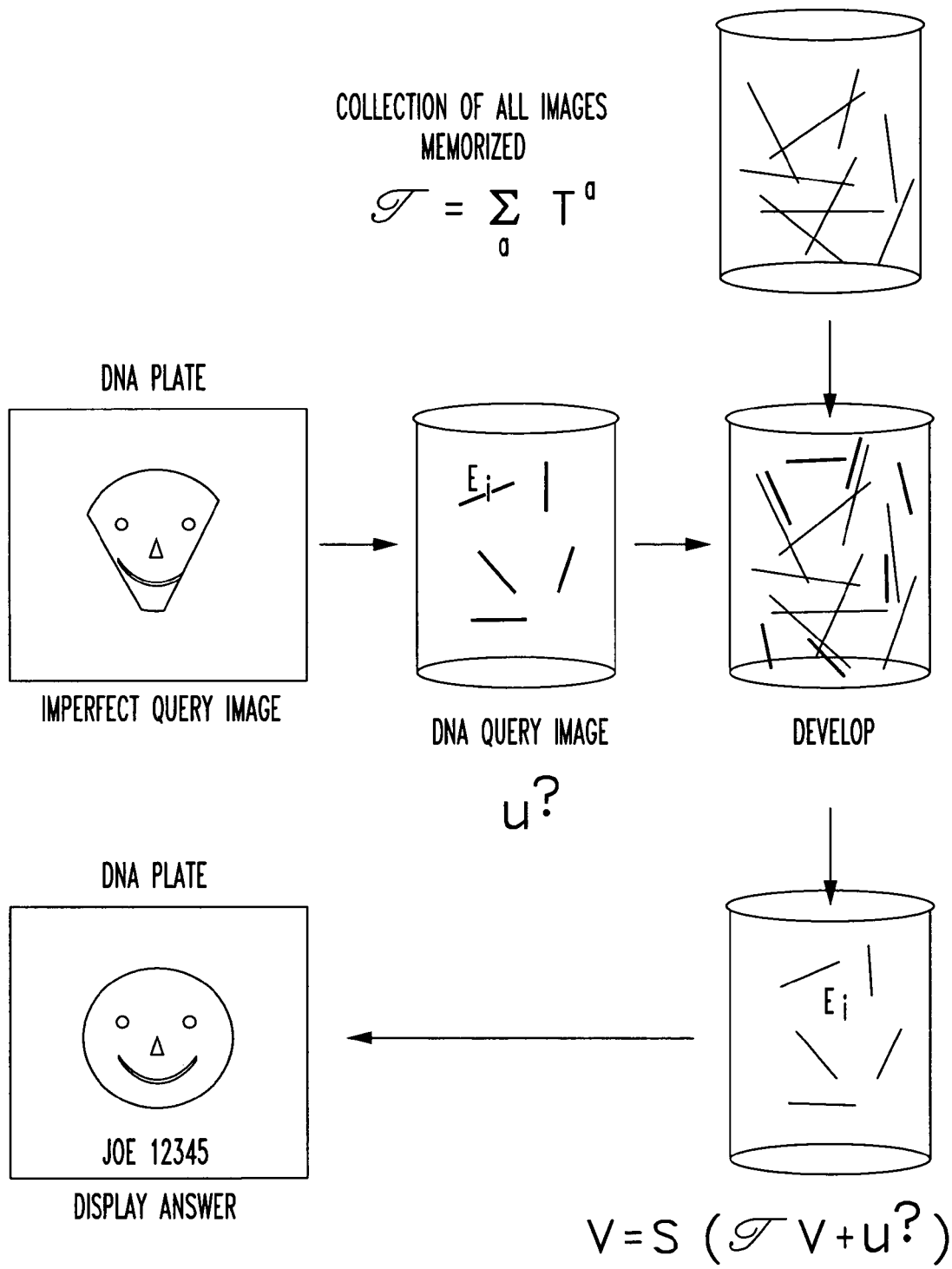
FIG. 4 shows retrieval of a complete image from the memory matrix $T_{ij}$, starting with a set of DNA strands that represent $U_i$, a vector containing only a very small part of the image. A saturating function is applied to the set of DNA strands that represent the product of the memory matrix $T_{ij}$ and the incomplete vector $U_i$ to yield a set of DNA strands representing $X_i$. Iterations of the method continue until a set of DNA strands is obtained that represents the complete image. Displaying partial and full images is illustrative of "reading" information from analog into digital form.

The information (e.g., the image) represented by the saturated set of oligomer strands S(X$_i$) produced by applying the saturating function to X$_i$ in one or more iterations, is derived by letting the selected set of X$_i$ oligomers hybridize to an array of complementary $E_i$ and $\underline{E}_i$ strands attached to a DNA chip, and detecting the double-stranded DNA molecules hybridized to the tethered oligomer array, in the same manner as described above for "reading" a set of DNA oligomers representing the solution to a vector operation (FIG. 4).

If further convergence of the S(X$_i$) strands to the V$_i$ data record is desired, the steps corresponding to Equations (3) and (4) are re-iterated by applying the saturating function to the set of oligomers corresponding to the inner product of the T$_{ij}$ memory matrix and the saturated X$_i$ vector which best represents V$_i$.

Depending on the length of the query vector, one iteration of Equations (3) and (4) may be sufficient to identify V$_j$, and two or more iterations of Equations (3) and (4) will be sufficient to force the mixture into a steady state answer to the query, which is attained when two successive iterations of the neural network process described above yield the same complete image or set of data (see FIG. 4).

All publications and patents mentioned in the above specification, including U.S. patent application Ser. No. 09/129,958, filed Aug. 6, 1998, entitled "Analog and Neural Network Computation Using DNA," and U.S. provisional application No. 60/239263, filed Oct. 12, 2000, entitled "DNA-Based Artificial Neural Networks" are incorporated herein by reference, in their entirety. Various modifications and variations of the described method and system of the invention will be apparent to those skilled in the art without departing from the scope and spirit of the invention.

The invention claimed is:

1. A method comprising, providing a set of weight oligomers tethered to one or more solid supports, each weight oligomer comprising one of a plurality of first subunit sequences and one of a plurality of double stranded second subunit sequences, the first subunit sequences represent a pattern of gene expression for a reference cell;

wherein said first subunit sequence is serially connected to said second subunit sequences, and each weight oligomer being a RNA or DNA oligonucleotide, RNA or DNA oligonucleotide analog or combination thereof; and wherein the first subunit sequences are configured to hybridize to nucleic acid molecules produced by said reference cell, and the second subunit sequences are configured to not hybridize to nucleic acid molecules produced by said reference cell;

extracting mRNA from a test cell;

mixing an assay of nucleic acid oligomers derived from said mRNA with said set of weight oligomers under conditions where said nucleic acid oligomers are capable of hybridizing to complementary first subunit sequences;

isolating signal oligomers from said second subunit sequences connected to said complementary first subunit sequences; and determining concentrations of said isolated second subunit sequences.

2. The method of claim 1, wherein extracting said mRNA further includes modifying said mRNA to form an mRNA analog.

3. The method of claim 1, wherein extracting said mRNA further includes amplification by forming a DNA copy of at least a portion of said mRNA and producing further copies of the DNA copy.

4. The method of claim 1, wherein extracting said mRNA further includes amplification by forming a RNA copy of at least a portion of said mRNA and producing further copies of the RNA copy.

* * * * *